US012366661B2

(12) United States Patent
Wang

(10) Patent No.: US 12,366,661 B2
(45) Date of Patent: Jul. 22, 2025

(54) TIME OF FLIGHT RANGING SYSTEM USING MULTI-VALUED SIGNALS

(71) Applicant: Yongxin Wang, San Ramon, CA (US)

(72) Inventor: Yongxin Wang, San Ramon, CA (US)

( * ) Notice: Subject to any disclaimer, the term of this patent is extended or adjusted under 35 U.S.C. 154(b) by 1151 days.

(21) Appl. No.: 17/216,299

(22) Filed: Mar. 29, 2021

(65) Prior Publication Data
US 2021/0302588 A1    Sep. 30, 2021

Related U.S. Application Data

(60) Provisional application No. 63/001,925, filed on Mar. 30, 2020.

(51) Int. Cl.
  *G01S 17/894*  (2020.01)
  *G01S 7/48*  (2006.01)
  (Continued)

(52) U.S. Cl.
  CPC .......... *G01S 17/894* (2020.01); *G01S 7/4802* (2013.01); *G01S 7/4913* (2013.01); *G01S 7/4915* (2013.01);
  (Continued)

(58) Field of Classification Search
  CPC .... G01S 17/894; G01S 7/4802; G01S 7/4915; G01S 17/26; G01S 17/34; G01S 7/4817; G01S 7/4913; G01S 17/32; G01S 17/89; G01S 17/42; G01S 2013/0245; G01S 13/32
  See application file for complete search history.

(56) References Cited

U.S. PATENT DOCUMENTS 5,013,151 A * 5/1991 Hughes .................. G01S 17/66
                                                        356/139.08
6,760,512 B2 * 7/2004 Pepper .................. G02F 1/011
                                                        398/52
(Continued)

OTHER PUBLICATIONS

International Search Report in the related PCT application No. PCT/US2021/024678, dated Jul. 20, 2021.
(Continued)

*Primary Examiner* — Isam A Alsomiri
*Assistant Examiner* — Joseph C Fritchman
(74) *Attorney, Agent, or Firm* — Chen Yoshimura LLP

(57) ABSTRACT

A time of flight (TOF) ranging system includes multiple emitters, each emitting a signal whose intensity, amplitude or polarization is modulated by a corresponding delayed modulation signal. Each delayed modulation signal is a delayed version of a time varying multi-valued modulation signal, the amount of delay being determined by a spatial position of the emitter and direction of a target point on the target. The signal reflected by the target is correlated with the original modulation signal to generate an output having a peak representing the TOF to the target point. The same process is performed to detect other target points. Another TOF ranging system includes one emitter and multiple detectors; the signal from each detector is delayed in a similar manner and their sum is correlated with the original modulation signal to generate an output representing TOF. Yet another TOF ranging system includes multiple emitters and multiple detectors.

26 Claims, 12 Drawing Sheets

(51) Int. Cl.
*G01S 7/4913* (2020.01)
*G01S 7/4915* (2020.01)
*G01S 17/26* (2020.01)
*G01S 17/32* (2020.01)
*G01S 17/34* (2020.01)

(52) U.S. Cl.
CPC .............. *G01S 17/26* (2020.01); *G01S 17/32* (2013.01); *G01S 17/34* (2020.01)

(56) References Cited

U.S. PATENT DOCUMENTS

| 7,724,994 B1* | 5/2010 | Pepper ................ H01Q 3/2676 385/27 |
| 7,729,572 B1* | 6/2010 | Pepper ................ H01Q 3/2682 385/27 |
| 9,410,800 B1 | 8/2016 | Oggier et al. |
| 2008/0175596 A1 | 7/2008 | Morcom |
| 2010/0097216 A1 | 4/2010 | Morcom |
| 2017/0074980 A1 | 3/2017 | Adib et al. |
| 2018/0156661 A1* | 6/2018 | Doylend ................ G01B 11/22 |
| 2019/0324128 A1 | 10/2019 | Dielacher |
| 2021/0026015 A1* | 1/2021 | Davydenko ........... G01S 7/4817 |
| 2021/0088631 A1* | 3/2021 | Otsuka ................ G01S 7/4817 |

OTHER PUBLICATIONS

Written Opinion in the related PCT application No. PCT/US2021/024678, dated Jul. 20, 2021.

* cited by examiner

TIME OF FLIGHT RANGING SYSTEM USING MULTI-VALUED SIGNALS

BACKGROUND OF THE INVENTION

Field of the Invention

This invention relates to a direct time of flight (TOF) ranging system, and in particular, it relates to a TOF ranging system in which multi-valued signals are used to generate temporal pulses for target ranging.

Description of Related Art

Light Detection and Ranging (LiDAR) systems are generally known. Time of flight (TOF) ranging systems employs time-of-flight techniques to measure distance between the sensor and the target object, by measuring the round trip time of an artificial light signal emitted by an artificial light signal emitted by a laser or LED or other types of light sources.

SUMMARY

The present invention is directed to a time of flight ranging system and related method that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a time of flight ranging system, which includes: a plurality of emitting devices forming an array; a signal generator configured to generate a time varying multi-valued modulation signal; a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the array and a target direction which is a direction from a reference point of the array to a target point on a target being ranged; wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal; a transmitting and receiving path, configured to transmit the plurality of wave signals emitted by the plurality of emitting devices toward the target and to receive a reflected wave signal reflected by the target, the reflected wave signal including the plurality of wave signals having been reflected by the target; a detector configured to detect the reflected wave signal and generate a detected signal; and a correlator, coupled to the signal processing unit to receive the time varying multi-valued modulation signal, and coupled to the detector to receive the detected signal, the correlator being configured to correlate the time varying multi-valued modulation signal with the detected signal to generate an output signal which represents a round trip flight time from the array to the target point.

In another aspect, the present invention provides a time of flight ranging system which comprises: a signal processing unit configured to generate a time varying multi-valued modulation signal; an emitting device coupled to the signal processing unit to receive the modulation signal, and configured to emit a wave signal having modulated intensities or modulated amplitudes or modulated polarizations that are proportional to the modulation signal; a transmitting and receiving path, configured to transmit the wave signal emitted by the emitting device toward the target and to receive a reflected wave signal reflected by the target; a plurality of detectors forming an array, each detector configured to detect the reflected wave signal and generate a detected signal; and a signal processing and correlating unit, coupled to the signal processing unit to receive the time varying multi-valued modulation signal, and coupled to the plurality of detectors to receive the corresponding detected signals, the signal processing and correlating unit being configured to delay the detected signal from each of the plurality of detectors by a predetermined time delay to generate a corresponding delayed signal, the predetermined time delay being determined by a spatial position of the corresponding detector in the array and a target direction which is a direction from a reference point of the array to a target point on a target being ranged, the signal processing and correlating unit further being configured to correlate the time varying multi-valued modulation signal with a sum of the plurality of delayed signals to generate an output signal which represents a round trip flight time from the array to the target point.

In another aspect, the present invention provides a time of flight ranging system which comprises: a plurality of emitting devices forming an array; a signal generator configured to generate a time varying multi-valued modulation signal; a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the array and a target direction which is a direction from a reference point of the array to a target point on a target being ranged; wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal; a transmitting and receiving path, configured to transmit the plurality of wave signals emitted by the plurality of emitting devices toward the target and to receive a reflected wave signal reflected by the target, the reflected wave signal including the plurality of wave signals having been reflected by the target; a plurality of detectors forming an array, each detector configured to detect the reflected wave signal and generate a detected signal; and a signal processing and correlating unit, coupled to the signal processing unit to receive the time varying multi-valued modulation signal, and coupled to the plurality of detectors to receive the corresponding detected signals, the signal processing and correlating unit being configured to delay the detected signal from each of the plurality of detectors by a predetermined time delay to generate a corresponding delayed signal, the predetermined time delay being determined by a spatial position of the corresponding detector in the array and a target direction which is a direction from a reference point of the array to a target point on a target being ranged, the signal processing and correlating unit further being configured to correlate the time varying multi-valued modulation signal with a sum of the plurality of delayed signals to generate an output signal which represents a round trip flight time from the array to the target point.

In some embodiments, each of the plurality of emitting devices includes a light emitter and a light emitter driver, wherein the light emitter driver is coupled to the signal processing unit to receive the corresponding delayed modulation signal and configured to drive the light emitter to emit a light signal having modulated intensities that are proportional to the corresponding delayed modulation signal, and wherein the plurality of light emitters of the plurality of emitting devices form an array of light emitters.

In some embodiments, each of the plurality of emitting devices includes a light modulator and a light modulator driver, wherein the light modulator driver is coupled to the signal processing unit to receive the corresponding delayed modulation signal and configured to drive the light modulator to modulate a light signal to generate a modulated light signal having modulated intensities or modulated amplitudes or modulated polarizations that are proportional to the corresponding delayed modulation signal, and wherein the plurality of light modulators of the plurality of emitting devices form an array of light modulators.

The time of flight ranging system may further comprises: an analog signal conditioning circuit disposed between the detector and the correlator and configured to process the detected signal generated by the detector; and a timing and digital control unit, coupled to and configured to provide control signals to the signal generator, the signal processing unit, the emitting devices, the analog signal conditioning circuit, and the correlator.

In some embodiments, the wave signal emitted by each emitting device has modulated intensities that are proportional to the corresponding delayed modulation signal. In some embodiments, the wave signal emitted by each emitting device has modulated amplitudes that are proportional to the corresponding delayed modulation signal. In some embodiments, the wave signal emitted by each emitting device has modulated polarizations that are proportional to the corresponding delayed modulation signal.

In some embodiments, the wave signal is a light signal or a radio signal or a mechanical signal.

In some embodiments, the signal generator is configured to sequentially generate multiple time varying multi-valued modulation signals, the signal processing unit is configured to sequentially generate multiple corresponding sets of delayed modulation signals, each set corresponding to a target point on the target, each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and the correlator is configured to sequentially correlate the multiple time varying multi-valued modulation signal with the detected signal to generate multiple output signals each representing a round trip flight time from the array to the corresponding target point.

In some embodiments, the signal generator is configured to simultaneously generate multiple time varying multi-valued modulation signals, the signal processing unit is configured to simultaneously generate multiple corresponding sets of delayed modulation signals, each set corresponding to a target point on the target, each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and the signal processing unit is further configured to superimpose multiple delayed modulation signals, among the multiple sets of delayed modulation signals, that correspond to the same emitting device; wherein the correlator is a multi-channel correlator which is configured to receive the multiple modulation signals and to separately and simultaneously correlate the multiple modulation signal with the detected signal to generate multiple output signals each representing a round trip flight time from the array to a corresponding target point.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a direct time of flight (TOF) ranging systems and related methods in which a multi-valued (analog) light signal is used to generate temporal pulses for target ranging. Instead of transmitting high peak power single pulse or pulse train as practiced in conventional TOF ranging methods, in embodiments of the present invention, the light signal transmitted to and received from the target is a multi-valued signal in a continuous or burst mode, with low peak power and low average power. The energy of the signal is spread in both the time domain and the frequency domain. Only after receiving the reflected signal from the target, temporal pulses (virtual pulses) are generated by calculating a correlation between the transmitted signal and the received signal, and used for TOF distance measurement. In this way, the signal to noise ratio (SNR) of the virtual pulses is greatly improved. As a result, a ranging system and the ranging method according to embodiments of the present invention minimize the interference from other devices including other ranging systems of the same type. This also means that the transmitter can easily meet all the safety regulation related to human safety. In addition, a ranging system and the ranging method according to embodiments of the present invention have superior tolerance for interferences from other devices including other ranging system of the same type and interferences from the environment. By measuring the time domain positions of the temporal pulses generated by the signal processing, the round trip flight time of the transmitted multi-valued signals from the ranging system to the target and then back to the ranging system can be determined. Due to the greatly improved SNR and greatly reduced time domain dimension of the temporal pulse signals, better resolution, precision and accuracy of the distance measurement results can be achieved.

Figure 1:
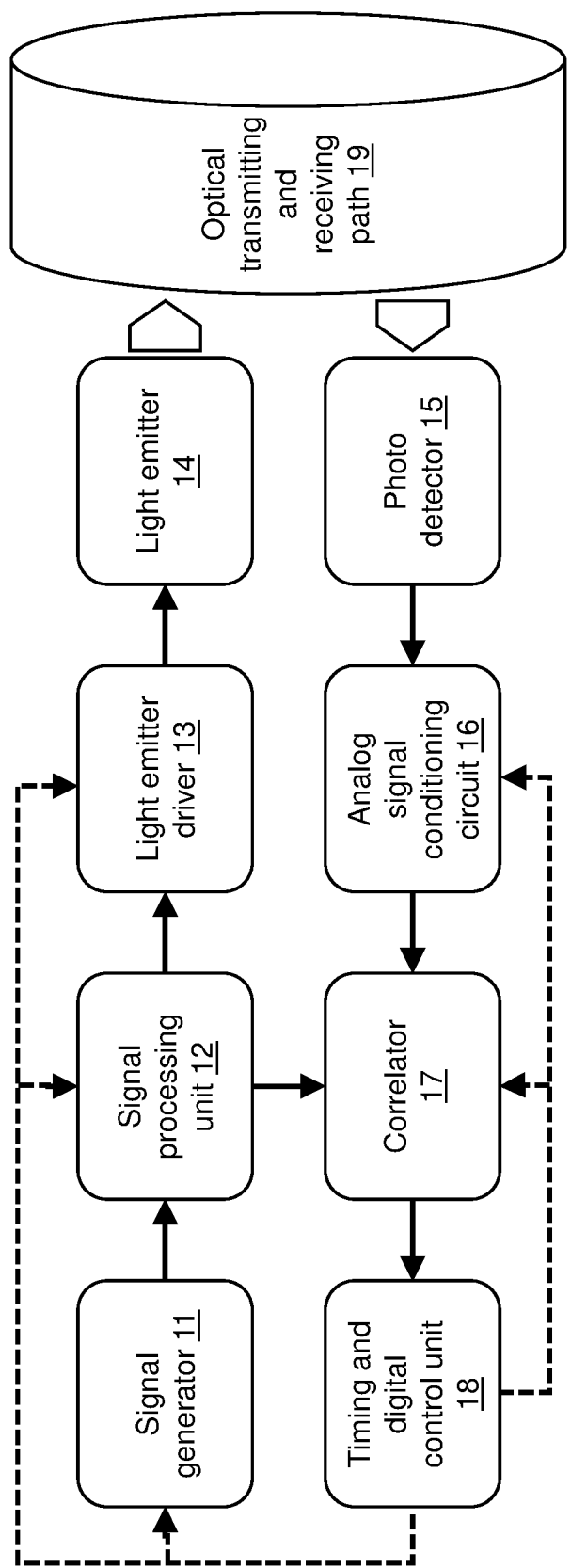
FIG. 1 illustrates a block diagram of a range finding system using a multi-valued signal with direct light modulation (internal modulation) according to a first embodiment of the present invention.
Figure 2:
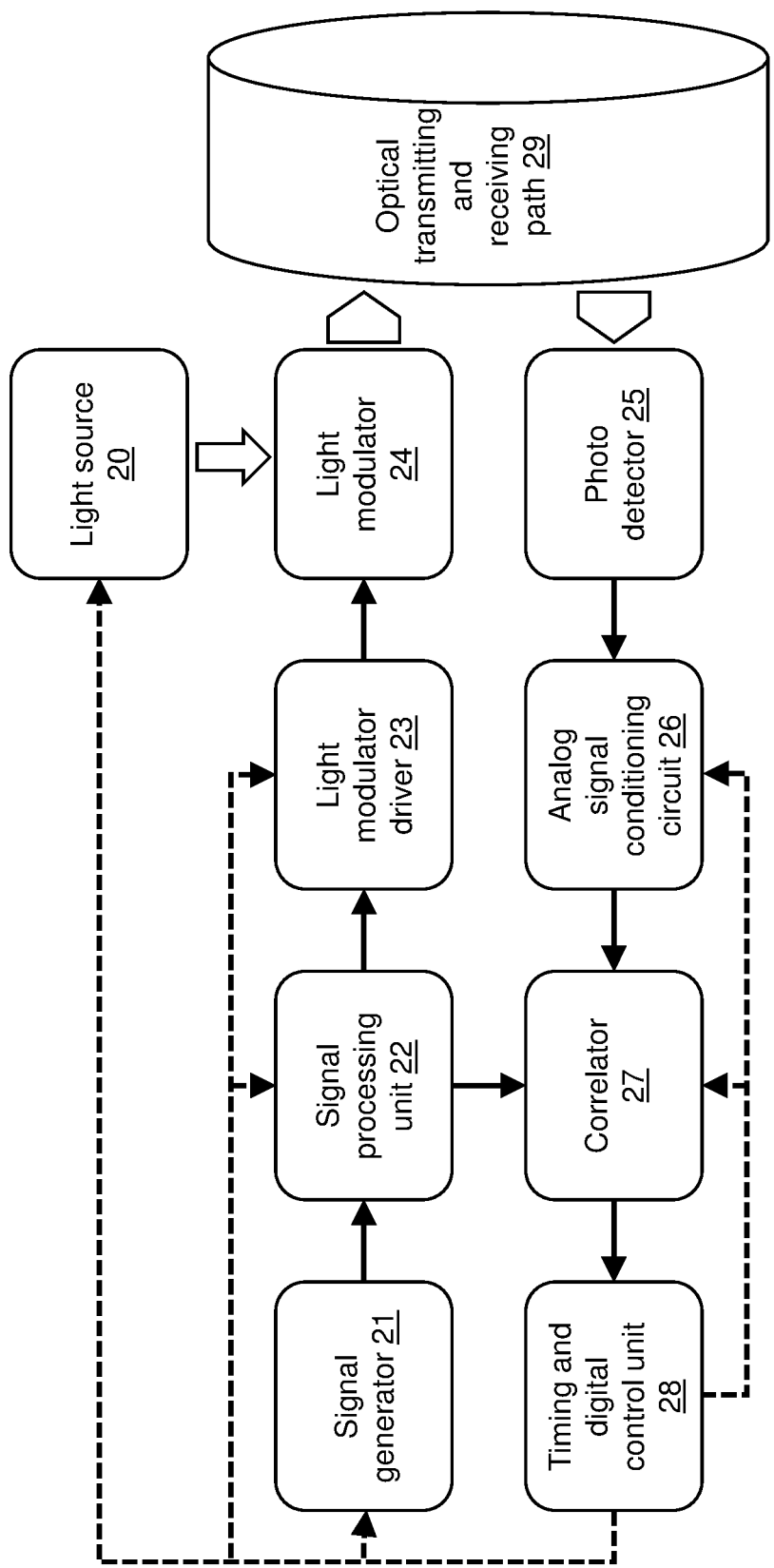
FIG. 2 illustrates a block diagram of a laser range finding system using a multi-valued signal with indirect light modulation (external modulation) according to a second embodiment of the present invention.

FIGS. 1 and 2 illustrates two configurations of ranging systems (ranging devices) according to embodiments of the present invention. FIGS. 3-8 illustrate a variety of configurations of lidars (ranging devices). In FIGS. 1-8, solid lines with arrows represent the signal paths related to TOF range finding signal processing; dashed lines with arrows represent the signal paths related to control signals in the systems which ensure the proper operation of the systems; hollow arrows represent light signals. Like components in the figures are represented by like reference symbols.

FIG. 1 illustrates a block diagram of a laser range finding system (ranging device) using a multi-valued signal with direct light modulation (internal modulation) according to a first embodiment of the present invention.

In this system, a signal generator 11 generates a time varying, multi-valued modulation signal. This signal is then sent to a signal processing unit 12. The signal processing unit 12 may perform operations such as amplification, sampling, storing, and digitizing with predefined bit resolution (greater than 1 bit) etc. Then the processed signal is sent from the signal processing unit 12 to both a transmitting channel (light emitter driver 13) and a receiving channel (correlator 17). In the transmitting channel, the signal is further amplified by a light emitter driver 13 and then used to directly drive the light emitter 14 to generate an intensity-modulated light signal (i.e. the intensity of the light signal is proportional to the time varying, multi-valued modulation signal) to illuminate the target. This is referred to as direct light modulation or internal modulation because the light emitter 14 directly generates the intensity-modulated light signal.

The light signal from the light emitter 14 is directed to the target by an optical transmitting and receiving path 19 and the reflected light from the target is directed by the optical transmitting and receiving path 19 to a photo detector 15.

The reflected light signal from the target is detected by the photo detector 15 to generate a detected signal, which is processed first by an analog signal conditioning circuit 16. Within the analog signal conditioning circuit 16, processes such as amplification, gating, storing, and digitizing with predefined bit resolution (greater than 1 bit) etc., may be performed. The processed signal from the analog signal conditioning circuit 16 is then sent to a correlator 17.

In this and other embodiments of the present invention, the time varying, multi-valued modulation signal has the following characteristics: (1) It is an analog signal having multiple signal values, as opposed to a digital (i.e. binary) signal having only two signal values. This aspect of the signal is referred to as "multi-valued". (2) The signal is a continuously time-varying signal in the time domain, or contains multiple bursts where the signal is continuously time-varying during each burst, as will be described in more detail later. In this disclosure, the terms "continuously time-varying signal" and "continuous signal" encompass both continuous mode and burst mode signals. Thus, the energy of the signal is spread broadly in the time domain. Such a signal is different from a pulse train containing narrow pulses separated by zero intensity intervals. (3) The frequency domain transform of the time domain signal is also continuous and relatively broad. Thus, the energy of the signal is also spread broadly in the frequency domain. (4) The signal is non-periodic, or is periodic with a sufficiently long period. If it is periodic, the period is longer than the estimated flight time difference between the nearest distance and farthest distance of the target object, to ensure that the multiple peaks in the correlation of the signals will not cause any ambiguities in the distance measurement. In the descriptions below, for convenience of description, a non-periodic signal is deemed a periodic signal having only one period. (5) The autocorrelation of the signal has only one significant peak at zero delay (i.e. it is approximately a delta function), and the signal is substantially uncorrelated with most other commonly encountered signal or noise.

In practice, the signal generator 11 may be a noise generator, such as a thermal noise generator, a shot noise generator such as a diode, etc. A noise signal generated by such a noise generator has the above described characteristics.

The correlator 17 generates a time domain correlation between the un-delayed modulation signal from the signal processing unit 12 and the delayed signal from the analog signal conditioning circuit 16 (the delay being due to the time of flight). The correlation process performed by the correlator 17 includes, without limitation, modulation signal storing, recalling, and time domain correlation between signals. The correlation is conducted in a way that is analog or digital or a combined way to improve the sensitivity and improve the signal to noise ratio. After correlation, even if the signal to noise ratio of each receiving path is below 0 dB, the final result will have a signal to noise ratio much higher than 0 dB. Due to the characteristics of the transmitted signal described above, the correlation (which is a time domain function) will have only one significant peak (referred to as a virtual pulse) per period, which carries information regarding the arriving time of the reflected signal from the target and hence the distance of the target. The virtual pulse as the result of the signal processing has improved signal to noise ratio, as well as narrow pulse width and fast transition time (rising time and/or falling time) (this is referred to as compression of the pulse in the time domain), which help improve the timing accuracy which lead to better distance or depth measurement resolution, precision, and accuracy. In short, in the virtual pulse generation process, the SNR of the received signal is greatly improved which ultimately provides the benefits such as much higher timing resolution, precision, and accuracy.

In a timing and digital control unit 18, the correlation result from the correlator 17 (i.e. the time domain function that contains only one significant peak per period) is used to derive the round trip flight time of the light signal from the laser ranging system to the target and back to the laser ranging system. A high resolution, high precision, and high accuracy distance information about the distance between the laser ranging system and the target can be acquired this way.

The timing and digital control unit 18 also supplies control signals to the signal generator 11, the signal processing unit 12, the light emitter driver 13, the analog signal conditioning circuit 16, and the correlator 17. The control signals may include: the signals sent to the signal processing unit to set the gain of amplification of the signal from the signal generator; the signal to initialize or control the digitizing or storing of the amplified signal; the timing signals for synchronization between the signal processing unit, the analog signal conditioning circuit, and the correlator and timing and digital control unit; the signals sent to the light emitter driver for gain control, and offset control; the signals sent to the analog signal conditioning circuit to adjust the gain, offset, and control signal digitizing; the signals sent to the correlator to control the process of correlation, etc.

As mentioned above, the time-varying light signal transmitted to the target may be in a continuous transmission mode (TRC) or a burst transmission mode (TRB) in the time domain. In the continuous transmission mode (TRC), the signal is transmitted continuously. In the burst transmission mode (TRB), the signal generated by the signal generator may be continuous, but it is transmitted only during burst intervals. In the continuous transmission mode (TRC), the receiving of the reflected signal may be conducted in a continuous receiving mode (RCC) or in a burst receiving mode (RCB). In the continuous receiving mode (RCC), the signal is received and processed continuously. In the burst receiving mode (RCB), the signal is received and processed during burst intervals only, and the time intervals between adjacent bursts can be filled with a constant or time varying function. In the burst transmission mode (TRB), the time intervals between adjacent bursts may be constant or time varying; the reflected signal is received and processed continuously.

FIG. 2 illustrates a block diagram of a laser range finding system using a multi-valued signal with indirect light modulation (external modulation) according to a second embodiment of the present invention. In the second embodiment, the signal generator 21, signal processing unit 22, photo detector 25, analog signal conditioning circuit 26, correlator 27, timing and digital control unit 28, and optical transmitting and receiving path 29 are respectively similar to the corresponding signal generator 11, signal processing unit 12, photo detector 15, analog signal conditioning circuit 16, correlator 17, timing and digital control unit 18, and optical transmitting and receiving path 19 of the first embodiment.

The main difference between the second and first embodiments is that in the transmitting channel of the second embodiment, the signal from the signal processing unit 22 is amplified by a light modulator driver 23 and then used to drive a light modulator 24 to modulate the intensity or amplitude or polarization of the light from an external light source 20 in order to generate the intensity-modulated or amplitude-modulated or polarization-modulated light signal to illuminate the target. This is referred to as indirect light modulation or external modulation.

For external modulation, the modulation may be either intensity modulation, or amplitude modulation, or polarization modulation. Correspondingly, when correlation is conducted, in the intensity modulation case, the two signals used to generate correlation results are the signal from the signal processing unit and the signal from the analog signal conditioning circuit; in the amplitude modulation or polarization modulation case, the two signals used to generate correlation results are the signal derived from the signal from the signal processing unit and the signal from the analog signal conditioning circuit. The derived signal is generated by calculating the square of the signal from the signal processing unit.

Figure 3:
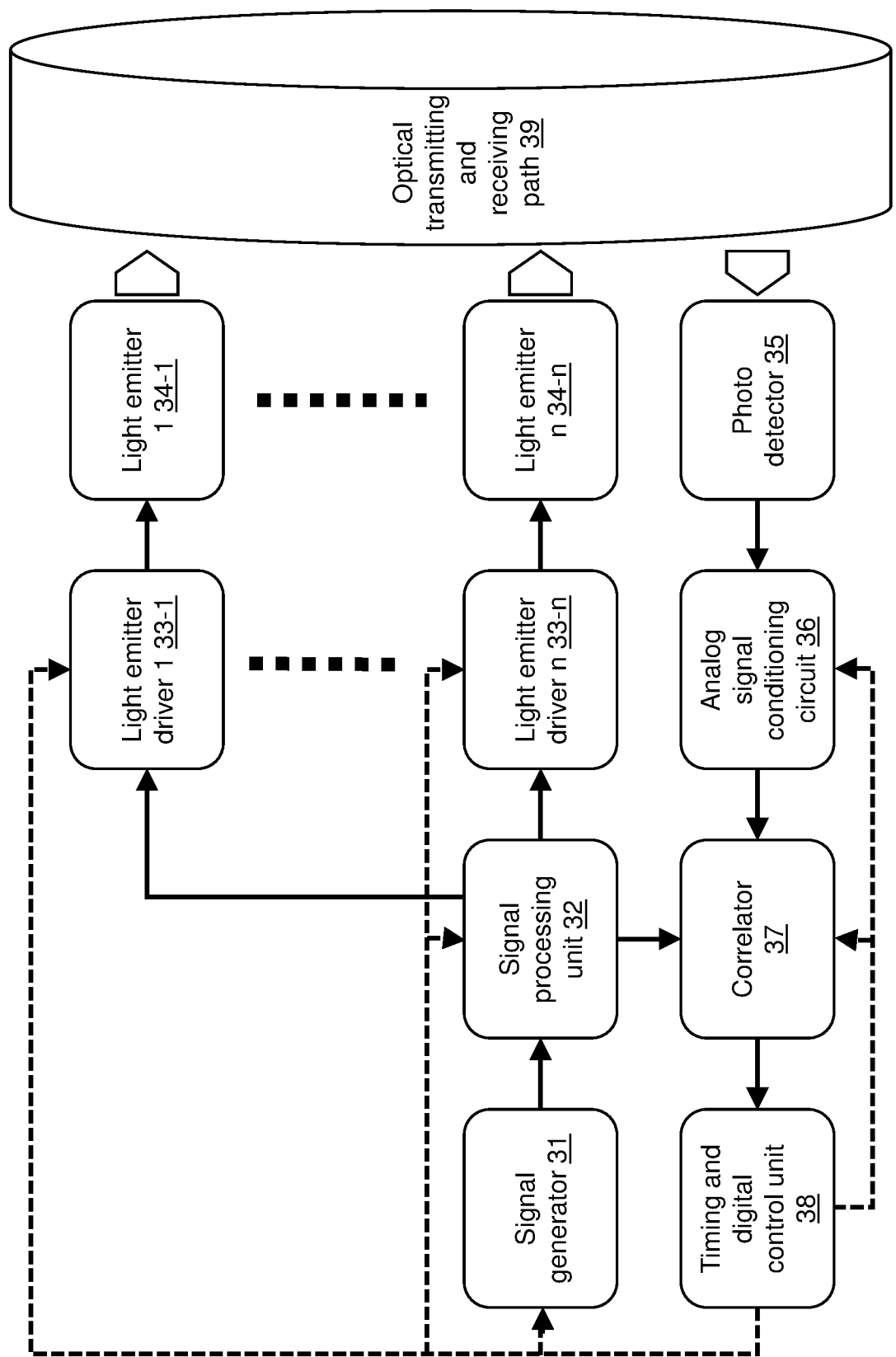
FIG. 3 illustrates a block diagram of an array lidar system using multi-valued signals with multiple direct light modulation transmitting channels and one single receiving channel according to a third embodiment of the present invention.

FIG. 3 illustrates a block diagram of an array lidar system using multi-valued signals with multiple direct light modulation transmitting channels and one single receiving channel according to a third embodiment of the present invention.

In this system, a signal generator 31 generates a time varying, multi-valued modulation signal. The signal has the characteristics described above in connection with the first embodiment. This signal is then sent to a signal processing unit 32. The signal processing unit 32 may perform operations such as amplification, sampling, storing, and digitizing with predefined bit resolution (greater than 1 bit) etc. Using the processed signal (referred to as the un-delayed signal or the source signal), the signal processing unit 32 generates multiple (e.g., n) delayed signals, each being a copy of the un-delayed signal with a predetermined time delay. Then the multiple delayed signals are sent from the signal processing unit 32 to multiple corresponding transmitting channels respectively, and the un-delayed signal is sent from the signal processing unit 32 to a receiving channel (correlator 37). In the transmitting channels, the multiple delayed signals are further amplified by multiple (e.g., n) corresponding light emitter drivers 33-1 to 33-n respectively, and then used to directly drive multiple (e.g., n) corresponding light emitters 34-1 to 34-n respectively to generate multiple (e.g., n) intensity-modulated light signals (i.e. the intensities of the intensity-modulated light signals are proportional to the corresponding delayed signals) to illuminate the target.

Figure 9:
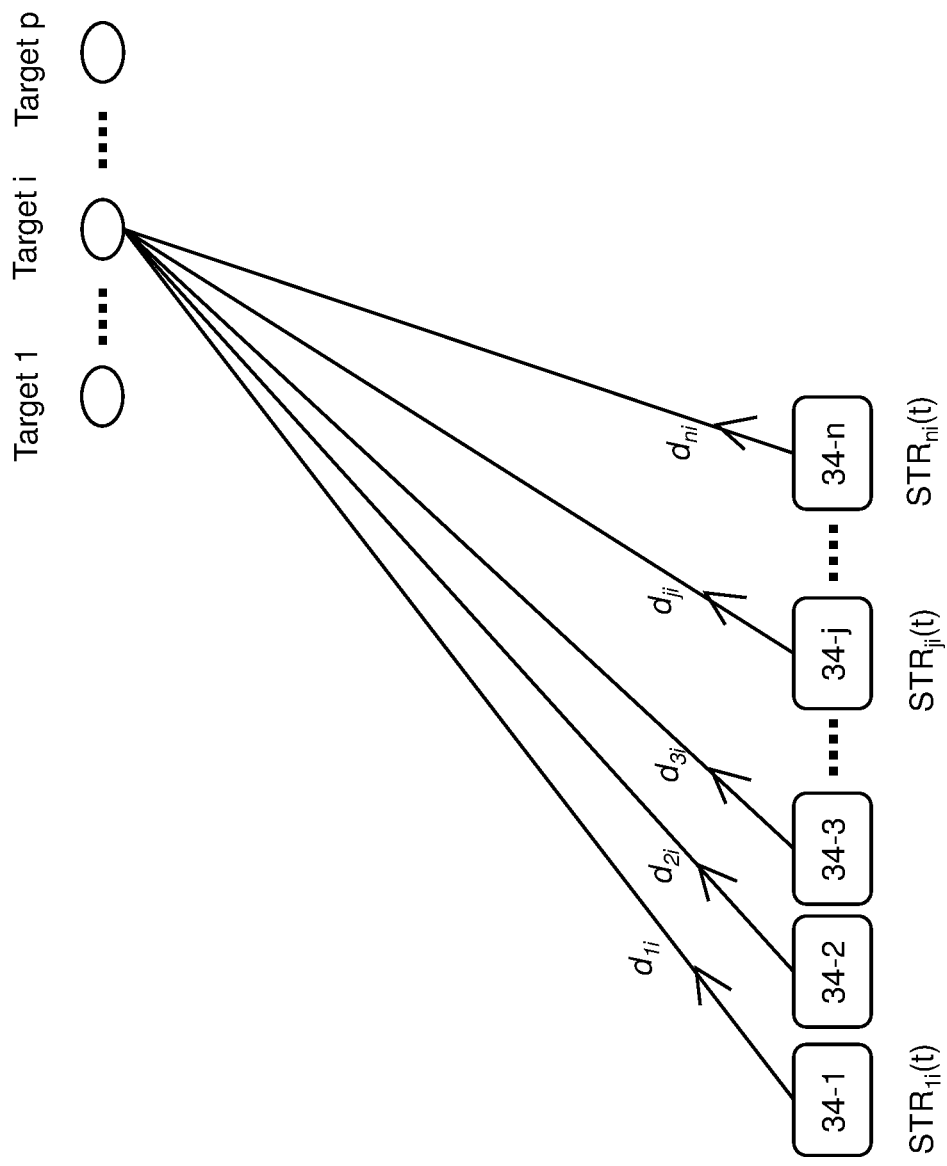
FIGS. 9, 9A and 9B schematically illustrate forming a transmitting virtual beam in the array lidar of the third embodiment.

The predetermined delays for the delayed signals are calculated so that for one specific point of the target, all the light signals from all the light emitters 34-1 to 34-n of the light emitter array have the same total time delays and are therefore synchronized when they arrive at the specific target point, as will be described in more detail later with reference to FIGS. 9, 9A and 9B. In this way a virtual transmitting light beam to the predetermined target point is formed. It should be noted that each point of the target corresponds to a direction from the ranging device (or more precisely, a specific point on the ranging device) to the target point; therefore, in this disclosure, any reference to a point of the target should be understood to also refer to a direction from the ranging device to the point of the target (target direction).

The light signals from the light emitters 34-1 to 34-$n$ are directed to the target by an optical transmitting and receiving path 39 and the reflected light from the target is directed by the optical transmitting and receiving path 39 to a photo detector 35.

The reflected light signal from the target is detected by the photo detector 35 to generate a detected signal, which is processed first by an analog signal conditioning circuit 36. Within the analog signal conditioning circuit 36, processes such as amplification, gating, storing, and digitizing with predefined bit resolution (greater than 1 bit) etc., may be conducted. The processed signal from the analog signal conditioning circuit 36 is then sent to a correlator 37. The correlator 37 generates a time domain correlation between the un-delayed signal from the signal processing unit 32 and the delayed signal from the analog signal conditioning circuit 36. During this process, one or a series of pulses which carries the arriving time of the reflected signal from the target are generated in the time domain. During the pulse generation process, the SNR of the received signal is greatly improved and compressed pulses are obtained which ultimately provides the benefits such as much higher timing resolution, precision, and accuracy. In a timing and digital control unit 38, the correlation result from the correlator 37 is used to derive the round trip flight time of the light signal from the laser ranging system to the target and back to the laser ranging system. A high resolution, high precision, and high accuracy distance information about the distance between the laser ranging system and the target can be then acquired.

The timing and digital control unit 38 also supplies control signals to the signal generator 31, the signal processing unit 32, the light emitter drivers 33-1 to 33-$n$, the analog signal conditioning circuit 36, and the correlator 37, similar to the timing and digital control unit 18 of the first embodiment.

The virtual transmitting light beam for the specific target point is described below with reference to FIGS. 9 and 9A. As shown in FIG. 9, for the specific target point (i-th target point in this example), the different light emitters have different distances to the target point and therefore different TOF for their respective light signals. It can be shown mathematically that under most conditions, the difference in the TOF for each light emitter relative to a reference point on the light emitter array (e.g., a reference light emitter, or an arbitrary geometric point on the light emitter array) can be approximately calculated based on (1) the geometric configuration of the light emitter array and (2) the angular position of the specific target point relative to the reference point on the light emitter array, without requiring any knowledge of the distance of the target point from the light emitter array.

Figure 9A:
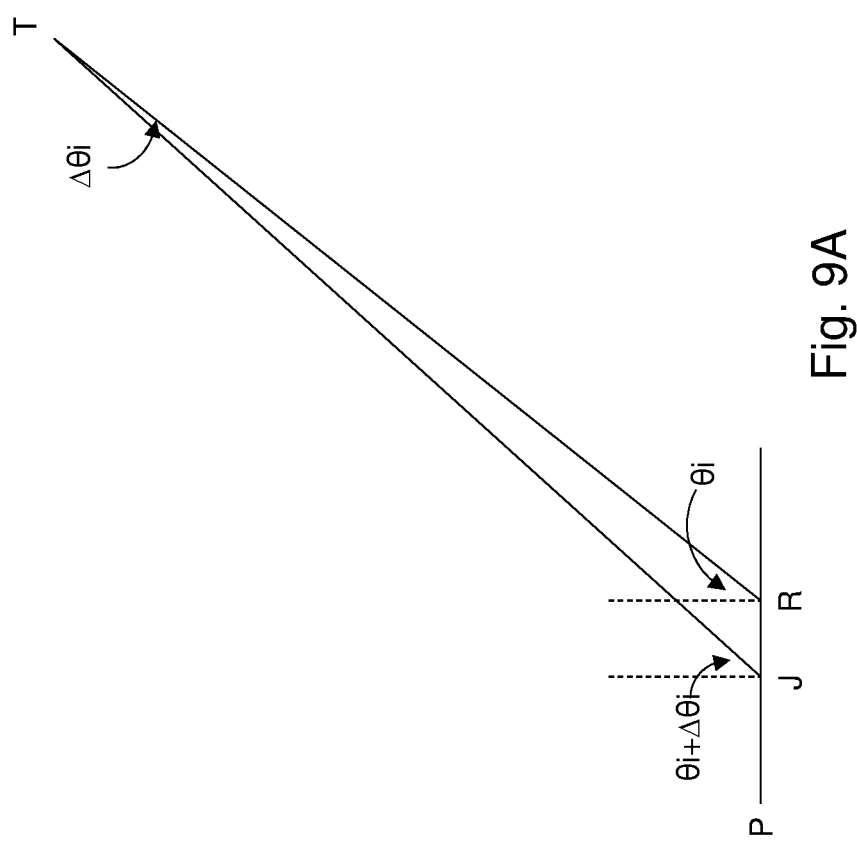

Refer to FIG. 9A, where T represents the i-th target point, R represents the reference point on the light emitter array (e.g. a selected one of the light emitters, the geometric center of the array of light emitters, or any arbitrary point of the physical structure of the lidar system), J represents the j-th light emitter, $\theta_i$ represents the angle of the line TR relative to the normal of the line JR, and $\theta_i+\Delta\theta_i$ represents the angle of the line TJ relative to the normal of the line JR. Note that when the reference point R lies in a plane P of the light emitter array as in the illustrated example, the angles $\theta_i$ and $\theta_i+\Delta\theta_i$ are relative to the normal of the plane of the light emitter array. It can be shown that $\Delta\theta_i$ is negligible which is typically true (because the physical size of the light emitter array is much smaller than the distance between the ranging device and the target). In other words, $\Delta\theta_i$ is typically negligible. Thus, the difference $\Delta d_{j,i}$ between the distance (TJ) from the i-th target point T to the j-th light emitter J and the distance (TR) from the i-th target point T to a physical reference point R is (Eq. (1)):

$$\Delta d_{j,i} = (TJ)-(TR) \approx (JR) * \sin\theta_i$$

when $\Delta\theta_i \approx 0$. The distance difference $\Delta d_{j,i}$ is independent of the distance from the light emitter array to the target. Note that the sign of $\Delta d_{j,i}$ depends on the relative location of the j-th light emitter J and the reference point R. This relationship applies to any arbitrary spatial arrangement of the light emitters in the light emitter array.

Note that in FIG. 9A, points J and R may also represent two adjacent light emitters, and Eq. (1) represents how the difference $\Delta d_{j,i}$ between their distances to the target point can be determined from their physical distance to each other (JR) and the angle $\theta_i$.

Figure 9B:
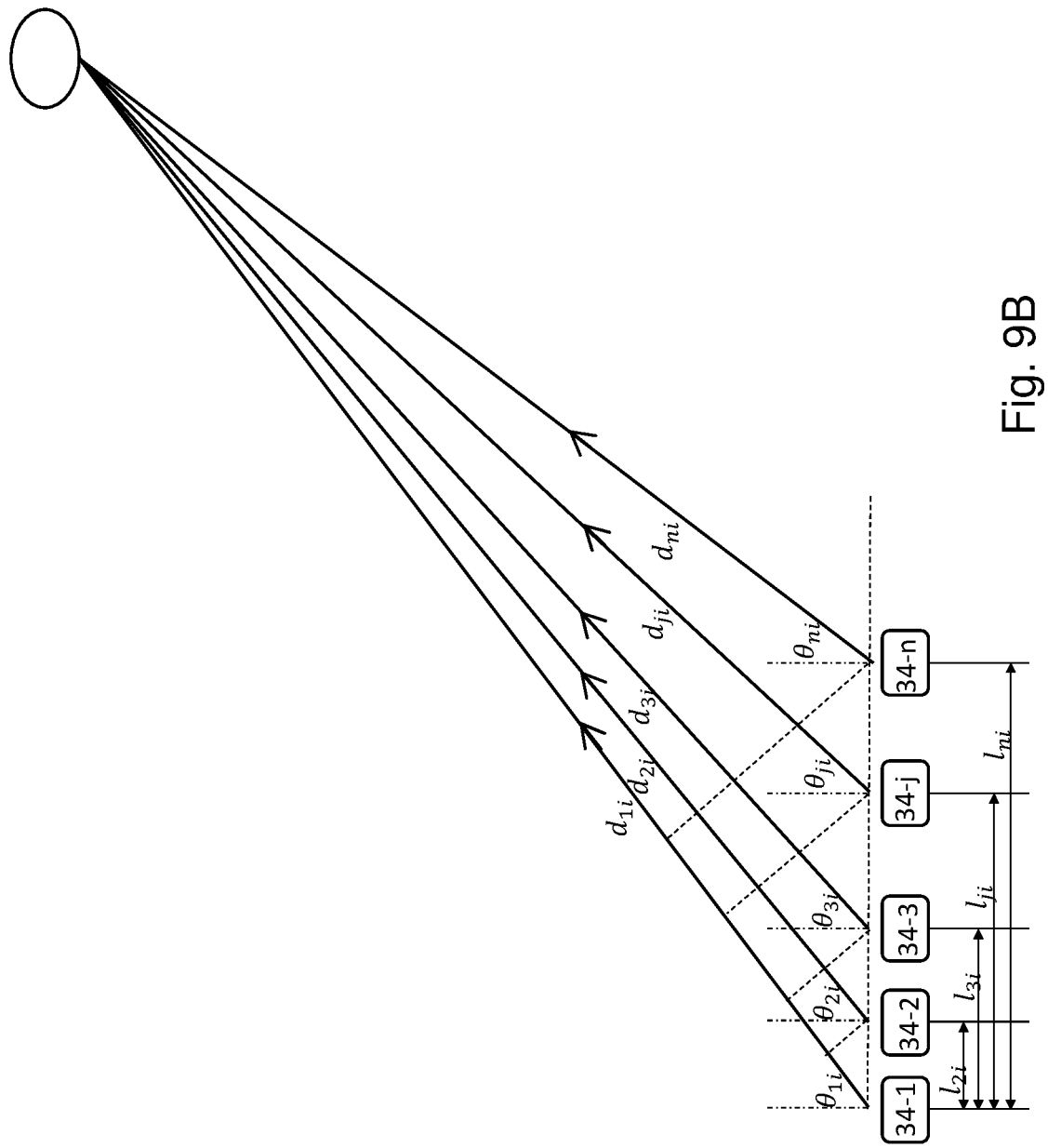

As shown in FIG. 9B, when the emitters are arranged in a regular one-dimensional array at equal distance from one another, again assuming $$\theta_{1i} \approx \theta_{2i} \approx \theta_{3i} \approx \ldots \approx \theta_{ji} \approx \ldots \approx \theta_{ni} \approx \theta_i$$

where $\theta_{ji}$ is the angle from the j-th transmitter to the i-th target point, it can be shown that $$\Delta d_{1\ to\ 2,i} \approx \Delta d_{2\ to\ 3,i} \approx \ldots \approx \Delta d_{(j-1)\ to\ j,i} \approx \ldots \approx \Delta d_{(n-1)\ to\ n,i} \approx \Delta d_i = l \cdot \sin(\theta_i)$$

where $\Delta d_{j-1\ to\ j,\ i}$ is the difference between the distance from the i-th target point T to the (j−1)-th light emitter and the distance from the i-th target point T to the j-th emitter, and/is the distance between adjacent light emitters. The difference $\Delta d_{j,i}$ between the distance from the i-th target point T to the j-th light emitter and the distance from the i-th target point T to the first emitter is $$\Delta d_{j,i} = (j-1) * l * \sin\theta_i.$$

In practice, the multiple light emitters of the lidar system are preferably arranged in a two-dimensional array in a plane, and the direction of the specific target point is described by both the polar angle $\theta$ and the azimuth angle $\varphi$. Those of ordinary skill in the art can easily expand the above calculation to a two-dimensional configuration to calculate the value of $\Delta d_{j,i}$ as a function of $\theta$, $\varphi$ and the position of the j-th emitter in the emitter array relative to a reference point.

Accordingly, the difference in the TOF for the j-th light emitter relative to the reference point is (Eq. (2)):

$$\Delta t_{ji} = \Delta d_{j,i}/c$$

where c is the speed of light. A positive $\Delta t_{ji}$ means that the j-th light emitter is located farther away from the target point than the reference point is and has a longer TOF than the reference point does, and a negative $\Delta t_{ji}$ means that the j-th light emitter is located closer to the target point than the reference point is and has a shorter TOF than the reference point does. To make the light signals from all light emitters synchronized when they arrive at the i-th target point, a time delay of $-\Delta t_{ji}$ is introduced in the light signal for the j-th light emitter to compensate for the difference in TOF. In practice, since the time delay $-\Delta t_{ji}$ for some light emitters may be negative (i.e. it requires a time advance rather than a delay), a constant time delay t0 is introduced in all of the signals to ensure that all signals have a positive time delay. This constant delay can be subtracted later when calculating the distance of the target. Thus, the time delay to be introduced in the signal for the j-th light emitter for ranging the i-th target point is to $-\Delta t_{ji}$. The multiple delayed signals generated by the signal processing unit 32 can be expressed as (Eq. (3)):

$$STR_{ji}(t)=STR0_i(t-(t0+\Delta t_{ji}))=STR0_i(t-t0-\Delta t_{ji}),$$
$$j=1,2,\cdots n$$

where $STR0_i$ is the un-delayed signal (the source signal) for ranging the i-th target point.

By introducing time delays calculated specifically for the i-th target point, the light signals from the multiple light emitters will arrive at the i-th target point in a synchronized manner. These signals are superimposed to form a strong reflected signal from the i-th target point that has the same shape as the source signal. The correlation (by the correlator 37) of such a reflected signal (as detected by the photon detector 35) with the source signal (from the signal processing unit 32) will produce strong peaks that indicate the distance of the i-th target point.

To the contrary, for all other target points, the light signals from the multiple light emitters will arrive at the target point out of synchronization with each other. Due to the nature of the signal generated by the signal generator, described earlier, the un-synchronized signals from the multiple light emitters will tend to cancel each other. As a result, the superimposed signals at the other target points will not have the same shape as the source signal, and the correlation of the reflected signal with the source signal will not produce strong peaks.

Thus, even though the light signals emitted by all light emitters simultaneously illuminate all points of the target, and all points of the target simultaneously reflect light signals from all light emitters to the photo detector 35, because the signals of the multiple light emitters are provided with time delays that are calculated for a specific target point in the above-described manner, the temporal peak in the correlation generated by the correlator will only represent the distance of the specific target point.

The above described process generates the distance information for the i-th target point. The process is performed sequentially for the multiple target points to obtain the distance of each target point, where each target point is described by a polar angle θ and an azimuth angle φ. In other words, different target points are ranged in different time periods; in each time period, a set of delayed modulation signals are generated for the corresponding target point. This way, the lidar system scans the target and sequentially obtains the distance for each point of the target. A two-dimensional distance map of the target can be generated this way.

For each target direction (i.e. target point), the signal used for ranging can be the same or different. If different signals are used for different target directions, multiple target directions can be ranged simultaneously, as will be discussed in more detail later.

Figure 4:
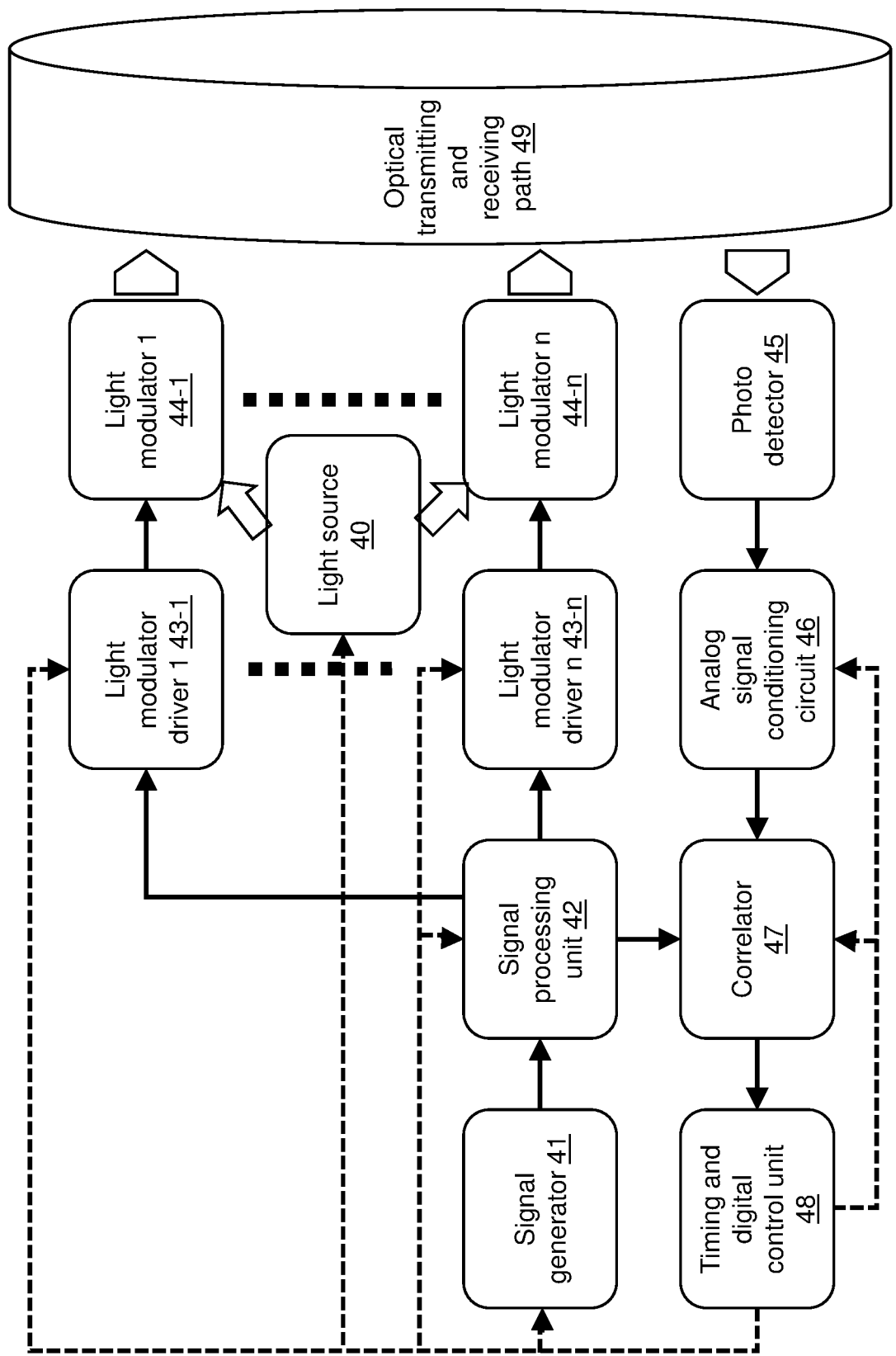
FIG. 4 illustrates a block diagram of an array lidar system using multi-valued signals with multiple indirect light modulation transmitting channels and one single receiving channel according to a fourth embodiment of the present invention.

FIG. 4 illustrates a block diagram of an array lidar system using multi-valued signals with multiple indirect light modulation transmitting channels and one single receiving channel according to a fourth embodiment of the present invention. In the fourth embodiment, the signal generator 41, signal processing unit 42, photo detector 45, analog signal conditioning circuit 46, correlator 47, timing and digital control unit 48, and optical transmitting and receiving path 49 are respectively similar to the corresponding signal generator 31, signal processing unit 32, photo detector 35, analog signal conditioning circuit 36, correlator 37, timing and digital control unit 38, and optical transmitting and receiving path 39 of the third embodiment.

The main difference between the fourth and third embodiments is that in the transmitting channels of the fourth embodiment, the signals from the signal processing unit 42 are amplified by multiple corresponding light modulator drivers 43-1 to 43-n and then used to drive the multiple corresponding light modulators 44-1 to 44-n to modulate the light from an external light source 40, in order to generate multiple modulated light signals. When calculating the time delays for the transmitting channels, the light modulators 44-j are equivalent to the light emitters 34-j in the third embodiment. In the third embodiment, each pair of light emitter 34 and corresponding light emitter driver 33 may be collectively referred to as an emitting device; in the fourth embodiment, each pair of light modulator 44 and corresponding light modulator driver 43 may be collectively referred to as an emitting device. The emitting devices in the third and fourth embodiments are implemented differently but they perform similar functions.

Figure 5:
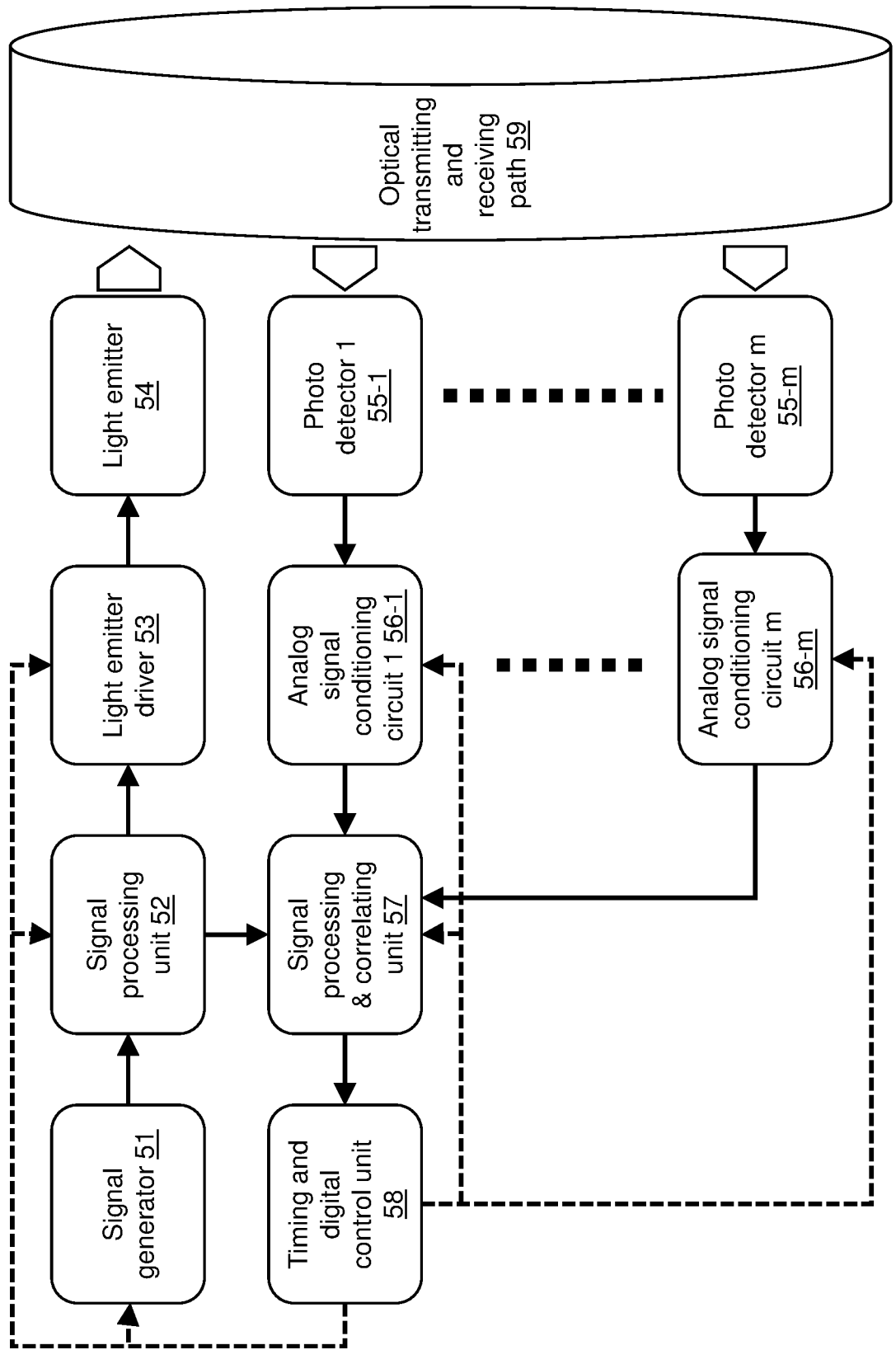
FIG. 5 illustrates a block diagram of an array lidar system using a multi-valued signal with one single direct light modulation transmitting channel and multiple receiving channels according to a fifth embodiment of the present invention.

FIG. 5 illustrates a block diagram of an array lidar system using multi-valued signals with one single direct light modulation transmitting channel and multiple receiving channels according to a fifth embodiment of the present invention.

In this system, a signal generator 51 generates a time varying, multi-valued signal. The signal has the characteristics described above in connection with the first embodiment. This signal is then sent to a signal processing unit 52. The signal processing unit 52 may perform operations such as amplification, sampling, storing, and digitizing with predefined bit resolution (greater than 1 bit) etc. Then the processed signal is sent from the signal processing unit 52 to both a transmitting channel and a signal processing and correlating unit 57 of the receiving channels. In the transmitting channel, the signal is further amplified by the light emitter driver 53 and then used to directly drive the light emitter 54 to generate the intensity-modulated light signal to illuminate the target.

The light signals from the light emitter 54 is directed to the target by an optical transmitting and receiving path 59 and the reflected light from the target is directed by the optical transmitting and receiving path to multiple photo detectors 55-1 to 55-m.

Figure 10:
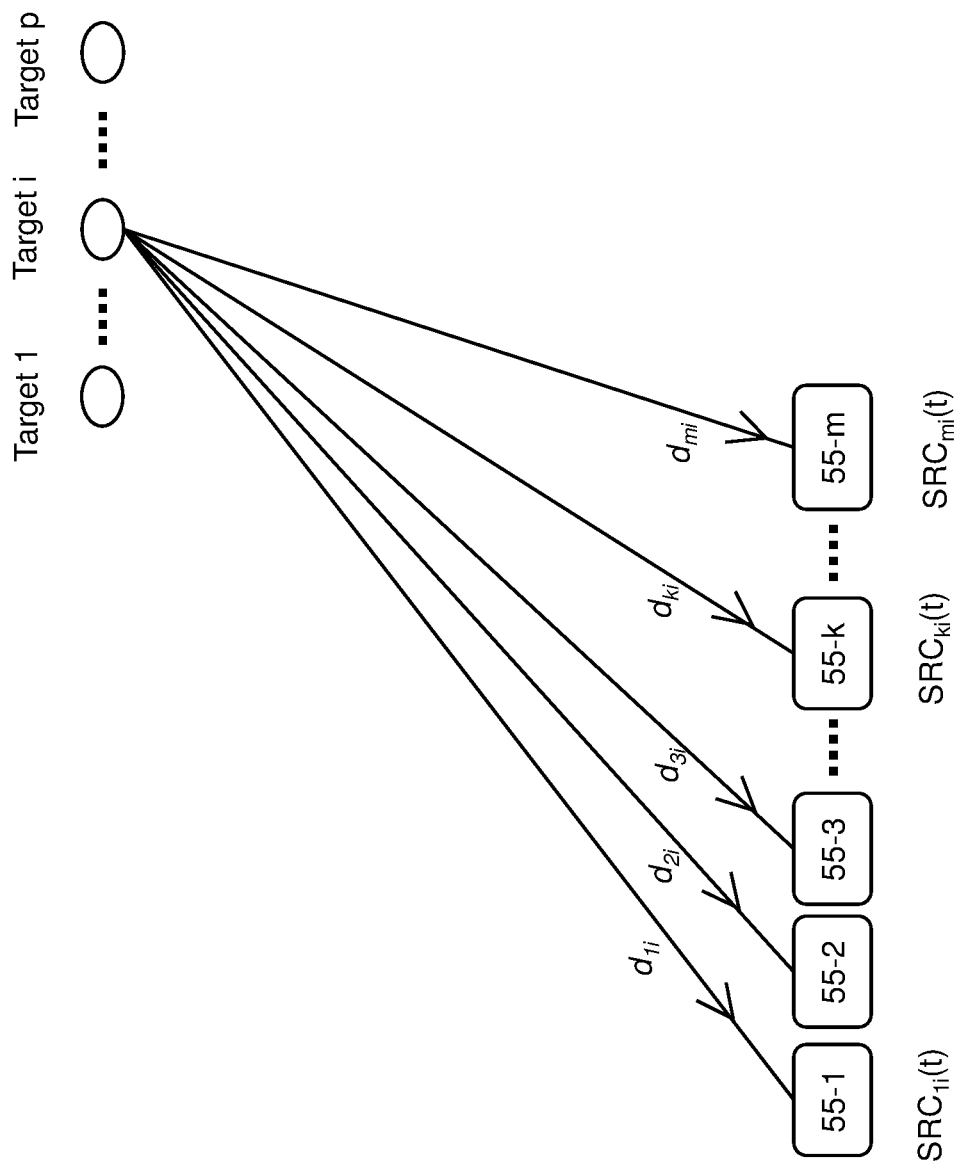
FIG. 10 schematically illustrates forming a receiving virtual beam in the array lidar of the fifth embodiment.

The reflected light signal from the target is detected by an array of multiple (e.g., m) photo detectors 55-1 to 55-m to generate corresponding detected signals, which are processed first by multiple (e.g., m) corresponding analog signal conditioning circuits 56-1 to 56-m in multiple receiving channels. Within each of the analog signal conditioning circuits, processes such as amplification, gating, storing, and digitizing with predefined bit resolution (greater than 1 bit) etc., may be conducted. The signals from the multiple analog signal conditioning circuits 56-1 to 56-m of the multiple receiving channels are then sent to a signal processing and correlating unit 57. The signal processing and correlating unit 57 delays the signals from each receiving channel by a predetermined time delay as illustrated in FIG. 10. The predetermined delays $-\Delta t_{ki}$ for the signals from different receiving channels k are calculated for a specific target point (e.g. the i-th target point in this example), based on the geometric configuration of the of the photo detector array and the angular position of the specific target point, in a manner similar to the calculation of the time delays in the third embodiment. A processed reflection signal specific for the i-th target point is then generated as the sum of all the delayed signals for the multiple receiving channels, forming a receiving virtual beam (Eq. (4)):

$$SRC_i(t) = \Sigma_{k=1\ to\ m} SRC_{ki}(t-t1-\Delta t_{ki})$$

where $SRC(t-t1-\Delta t_{ki})$ is the delayed signal from the k-th receiving channel. Here, t1 is a constant delay introduced in the signals from all receiving channels.

Then a correlation result between the un-delayed signals from the signal processing unit 52 and the processed reflection signal (the receiving virtual beam) $SRC_i(t)$ is generated. Because the delays $-\Delta t_{ki}$ introduced in the received signals are specifically calculated for the i-th target point, the signals that have been reflected by the i-th target point will be synchronized after the delays are introduced, so the processed reflection signal $SRC_i(t)$ has a similar shape as the source signal from the signal processing unit 52 and will produce a strong peak in the correlation result. To the contrary, for all other target points, the multiple delayed signals for the multiple receiving channels will be out of synchronization with each other and will tend to cancel each other. As a result, the contribution to the processed reflection signal $SRC_i(t)$ from the other target points will not produce strong peaks in the correlation result. Thus, even though the light signal received by the multiple photo detectors have contributions from all points of the target, the temporal peak in the correlation result will only represent the distance of the i-th target point. The process above is performed for each target point to obtain the distance of each target point. Again, each target point is described by a polar angle $\theta$ and an azimuth angle $\varphi$.

Similar to the third embodiment, during the pulse generation process, the SNR of the received signal is greatly improved which ultimately provides the benefits such as much higher timing resolution, precision, and accuracy. In a timing and digital control unit 58, the correlation results from the correlator 57 is used to derive the round trip flight time of the light signal from the laser ranging system to the target and back to the laser ranging system. A high resolution, high precision, and high accuracy distance information about the distance between the laser ranging system and the target can be then acquired.

The timing and digital control unit 58 also supplies control signals to the signal generator 51, the signal processing unit 52, the light emitter driver 53, the analog signal conditioning circuits 56-1 to 56-m, and the signal processing and correlating unit 57, similar to the timing and digital control unit 18 of the first embodiment.

Figure 6:
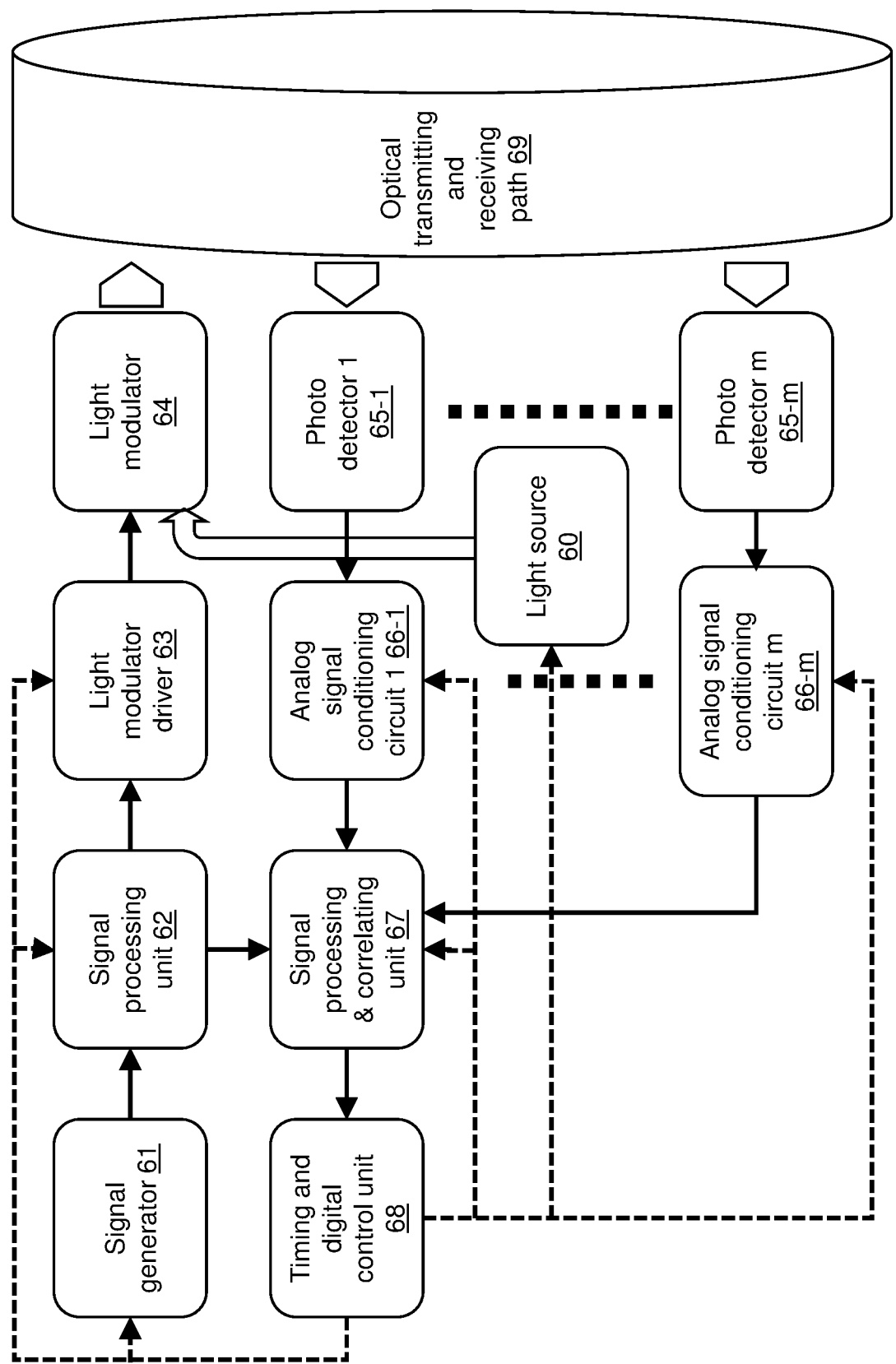
FIG. 6 illustrates a block diagram of an array lidar system using a multi-valued signal with one single indirect light modulation transmitting channel and multiple receiving channels according to a sixth embodiment of the present invention.

FIG. 6 illustrates a block diagram of an array lidar system using multi-valued signals with one single indirect light modulation transmitting channel and multiple receiving channels according to a sixth embodiment of the present invention. In the sixth embodiment, the signal generator 61, signal processing unit 62, photo detectors 65-1 to 65-m, analog signal conditioning circuits 66-1 to 66-m, signal processing and correlating unit 67, timing and digital control unit 68, and optical transmitting and receiving path 69 are respectively similar to the corresponding signal generator 51, signal processing unit 52, photo detectors 55-1 to 55-m, analog signal conditioning circuits 56-1 to 56-m, signal processing and correlating unit 57, timing and digital control unit 58, and optical transmitting and receiving path 59 of the fifth embodiment.

The main difference between the sixth and fifth embodiments is that in the transmitting channel of the sixth embodiment, the signal from signal processing unit 62 is amplified by the light modulator driver 63 and then used to drive the light modulator 64 to modulate the light from an external light source 60 in order to generate the modulated light signal to illuminate the target. The pair of light emitter 54 and corresponding light emitter driver 53 may be collectively referred to as an emitting device, and the pair of light modulator 64 and corresponding light modulator driver 63 may be collectively referred to as an emitting device.

Figure 7:
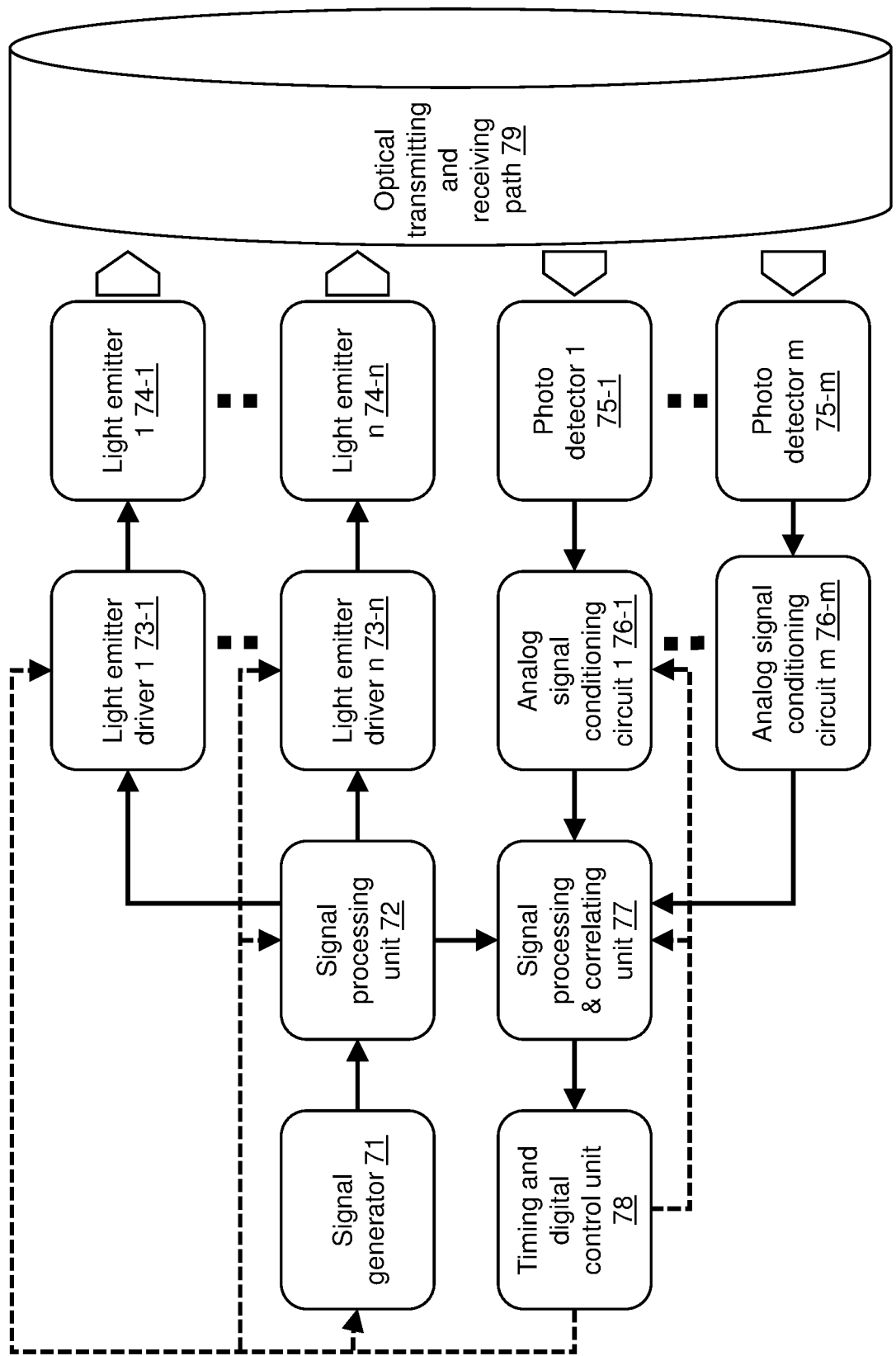
FIG. 7 illustrates a block diagram of an array lidar system using multi-valued signals with multiple direct light modulation transmitting channels and multiple receiving channels according to a seventh embodiment of the present invention.

FIG. 7 illustrates a block diagram of an array lidar system using multi-valued signals with multiple direct light modulation transmitting channels and multiple receiving channels according to a seventh embodiment of the present invention. In the seventh embodiment, the signal generator 71, signal processing unit 72, multiple light emitter drivers 73-1 to 73-n, and multiple respective light emitters 74-1 to 74-n are respectively similar to the corresponding signal generator 31, signal processing unit 32, multiple light emitter drivers 33-1 to 33-n, and multiple respective light emitters 34-1 to 34-n of the third embodiment. The multiple photo detectors 75-1 to 75-m, multiple analog signal conditioning circuits 76-1 to 76-m, signal processing and correlating unit 77, and timing and digital control unit 78 are respectively similar to the multiple photo detectors 55-1 to 55-m, analog signal conditioning circuits 56-1 to 56-m, signal processing and correlating unit 57, and timing and digital control unit 58 of the fifth embodiment.

Similar to the virtual beam forming in the array lidar of the earlier embodiments, virtual beams are formed in the distance measuring process for each specific target point. In this embodiment, however, both a transmitting virtual beam and a receiving virtual beam are formed for each specific target point, instead of only a transmitting virtual beam as in the third embodiment (FIG. 3) or only a receiving virtual beam as in the fifth embodiment (FIG. 5). The system of this embodiment can be seen as a combination of parts of the third embodiment (FIG. 3) and parts of the fifth embodiment (FIG. 5).

Figure 8:
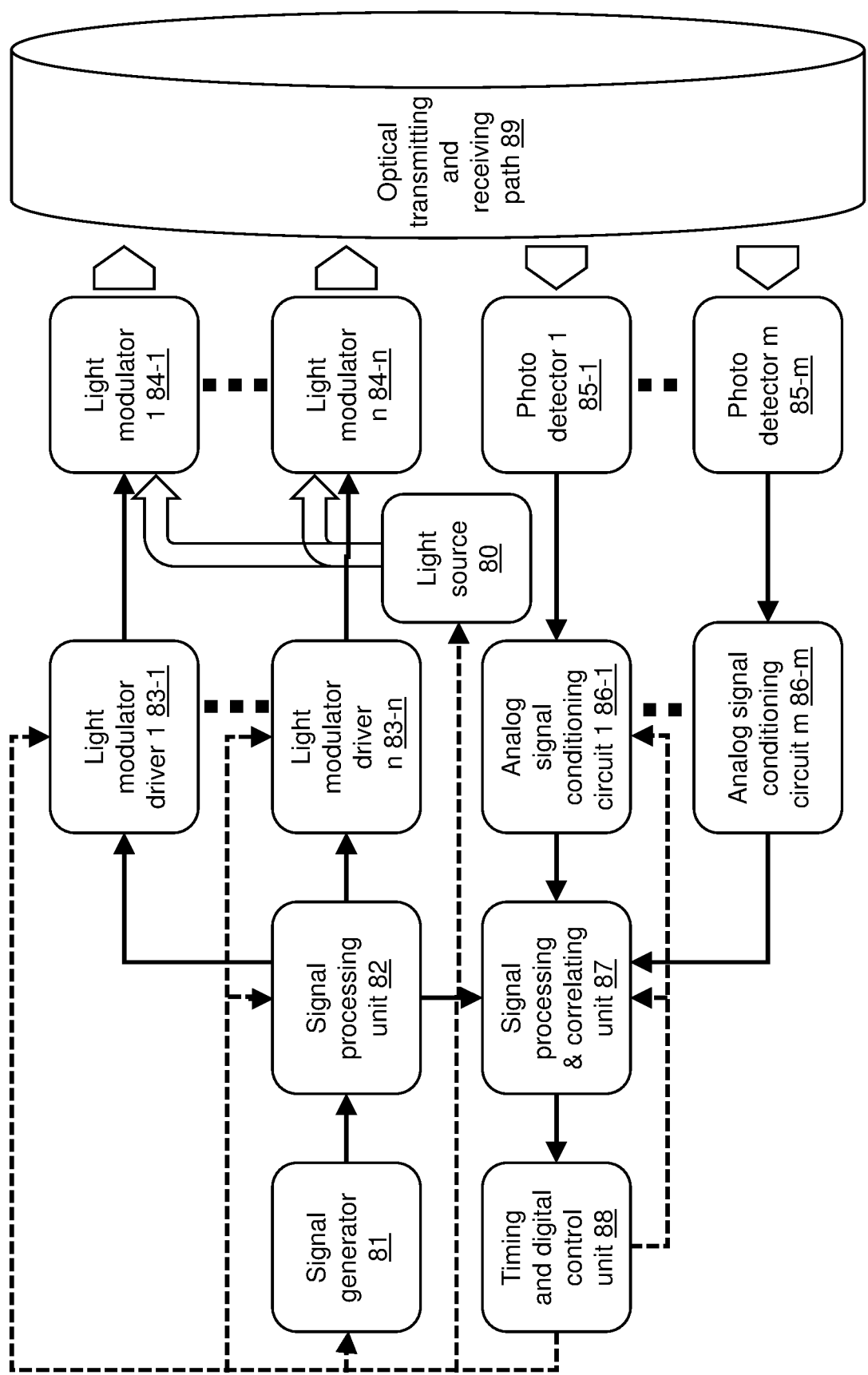
FIG. 8 illustrates a block diagram of an array lidar system using multi-valued signals with multiple indirect light modulation transmitting channels and multiple receiving channels according to an eighth embodiment of the present invention.

FIG. 8 illustrates a block diagram of an array lidar system using multi-valued signals with multiple indirect light modulation transmitting channels and multiple receiving channels according to an eighth embodiment of the present invention. In the eighth embodiment, the signal generator 81, signal processing unit 82, multiple photo detectors 85-1 to 85-m, multiple analog signal conditioning circuits 86-1 to 86-m, signal processing and correlating unit 87, timing and digital control unit 88, and optical transmitting and receiving path 89 are respectively similar to the corresponding signal generator 71, signal processing unit 72, multiple photo detectors 75-1 to 75-m, multiple analog signal conditioning circuits 76-1 to 76-m, signal processing and correlating unit 77, timing and digital control unit 78 and optical transmitting and receiving path 79 of the seventh embodiment.

The main difference between the eighth and seventh embodiments is that in the transmitting channels of the eighth embodiment, the signal from signal processing unit 82 is amplified by the multiple light modulator drivers 83-1 to 83-n and then used to drive the respective multiple light modulators 84-1 to 84-n to modulate the light from an external light source 80 in order to generate multiple modulated light signals to form virtual beam or beams for one or more predetermined targets. Each pair of light emitter 74 and corresponding light emitter driver 73 may be collectively referred to as an emitting device, and each pair of light modulator 84 and corresponding light modulator driver 83 may be collectively referred to as an emitting device.

The above-described system and method may be expanded as follows. At any time, one or more virtual beams can be formed. One or more scanning transmitting virtual beams or more than one static transmitting virtual beam can be formed to illuminate an area in the target zone. One or more scanning receiving virtual beams or more than one static receiving virtual beam can be formed to detect an area in the target zone.

More specifically, for each target direction (i.e. target point), the time varying multi-valued modulation signal used for ranging can be the same or different. If different modulation signals are used for different target directions, multiple target directions can be ranged simultaneously. Under this condition, multiple different modulation signals (which are uncorrelated with each other) are generated and used to generate the light signals by the transmitting channel. In the embodiments of FIGS. 3 and 4, the signal processing unit generates multiple sets of delayed modulation signals, where each set is based on one of the modulation signals with delays calculated for one of the target points, in the manner described earlier. The multiple delayed modulation signals that correspond to each emitting device are superimposed and then used to drive that emitting device. Alternatively, the array of emitting devices may be divided into multiple sub-arrays, and each sub-array uses a set of delayed modulation signals that are based on one of the multiple modulation signals with delays calculated for one of the target points (so no superimposition is needed). In another alternative embodiment, sub-arrays are used to form beams, and there are overlap between sub-arrays. In the receiving channel, the multiple different modulation signals are individually received from the signal processing unit, and the receiving channel uses a multi-channel correlator to process the reflected signals from the target in parallel (i.e. separately and simultaneously), where each channel performs correlation using one of the multiple modulation signals to produce the result for one target point. Note that the number of the sets of delayed signals and the number of the channels in the correlator may be the same or different. Both numbers may be one.

In the embodiments of FIGS. 5 and 6, one modulation signal or multiple different modulation signals may be used, where the multiple different modulation signals are superimposed and then the superimposed signal is used to generate the light signals by the emitting device. In the receiving channel, a multi-channel signal processing and correlating unit is provided, where each channel uses the one modulation signal or one of the multiple modulation signals to process the received signal using delays calculated for one target point. In other words, each channel of the multi-channel signal processing and correlating unit generates a set of delayed signals from the signals detected by the detector array using delays calculated for one target point, sums them up, and then correlates the sum with the one modulation signal or one of the multiple modulation signals. Even with the same one modulation signal in the transmitter channel, due to the receiving channel beam forming with the multi-channel signal processing and correlating unit described above, different target directions can be ranged at the same time. Note that the number of the sets of delayed signals and the number of the channels in the signal processing and correlating unit may be same or different. Both numbers may be one. In the embodiments of FIGS. 7 and 8, the target directions may be divided into different groups, and each group of target directions may share one of the multiple different modulation signals. Also, in the embodiments of FIGS. 5-8, multiple modulation signals may be used to simultaneously range each target point multiple times, and the average of the results for each target point may be calculated, so that the ranging precision and accuracy can be further improved and the system is more tolerance to interferences. And all these are achieved without sacrificing the throughput or update rate of the system.

By simultaneously ranging in multiple directions, the throughput of the range finding system can be improved. For example, instead of scanning the target area one point by one point, the target area can be scanned by one or multiple lines or one or multiple sub areas. Further, the target area can be detected by forming image with predefined resolution i.e., a predefined number of target directions used to cover the target area can be used to do range finding within the target area simultaneously which can result in one frame of 3D image of the target area.

Additional Embodiments—Amplitude-Modulation or Polarization-Modulation

In the above embodiments that use indirect light modulation in transmitter channels (FIGS. 2, 4, 6 and 8), the light signal transmitted by the transmitting channels (the light emitters and light modulators) can be modulated in different ways as mentioned previously. In Eq. (3), each transmitted signal $STR_{ji}(t)$ represents a modulated light intensity. In alternative embodiments, the light signal transmitted by the transmitting channels may be amplitude-modulated or polarization-modulated. Let $m_{ji}(t)$ be the modulation signal to be used to modulate the j-th light emitting channel for ranging the i-th target point, i.e., $m_{ji}(t)=m_i(t-t0-\Delta t_{ji})$. The equations for intensity modulation, amplitude modulation, and polarization modulation can be respectively written as (Eqs. (5), (6) and (7), respectively):

$$I_{ji}(t)=I_{0i} \cdot m_{ji}(t)$$

$$\vec{E}_{ji}(t)= \vec{E}_{0i}(t) \cdot m_{ji}(t)=E_{0i}(t) \cdot \hat{u}_i \cdot m_{ji}(t)=A_{0i} \cdot m_{ji}(t) \cdot e^{i(\omega t + \varphi_0)} \cdot \hat{u}_i$$

and $$\vec{E}_{ji}(t)=E_{0i}(t) \cdot \hat{u}_i(m_{ji}(t))=A_{0i} \cdot e^{i(\omega t + \varphi_0)} \cdot \hat{u}_i(m_{ji}(t))$$

where j denotes the j-th channel and i indicates that the various quantities are for ranging the i-th target point (or target direction); $I_{ji}(t)$ denotes the modulated light intensity, $I_{0i}$ denotes the unmodulated light intensity, $E_{ji}(t)$ denotes the modulated electric field strength of the light, $E_{0i}$ denotes the unmodulated electric field strength, $A_{0i}$ denotes the unmodulated amplitude of the electric field strength, w and Po respectively denote the angular frequency and initial phase of the unmodulated light wave, and $\hat{u}_i$ denote the unit vector which indicates the direction of the electric field. For the polarization modulation, the angle of the unit vector $\hat{u}_i$ may be in proportion to the value of the modulation signal $m_{ji}(t)$.

Intensity and amplitude modulators are known in the art, and any suitable such modulators may be used. The detectors in the receiving channel can detect light intensities, although they cannot distinguish between intensity-modulated and amplitude-modulated signals.

In the correlation step, however, the modulation signal from the signal processing unit is transformed to represent the intensity (e.g., the signal is squared), so that it can be compared and correlated with the received intensity signal.

Polarization modulators may be constructed as follows. A polarizing beam splitter or other suitable component is used to divide the source light into two polarization components. Amplitude or intensity modulators or other suitable components are used to change (modulate) the ratio of the two polarized components as a function of time. A beam combiner, for example a partially transmitting and partially reflecting mirror, is used to re-combine the two polarization components into one beam.

It should be noted that amplitude modulation or polarization modulation can be applied in the systems shown in FIGS. 2, 4, 6 and 8, but not in the systems shown in FIGS. 1, 3, 5 and 7. In the systems shown in FIGS. 4 and 8, light sources with better coherence length may be used when amplitude or polarization modulation is applied to further improve the energy efficiency of the transmitter channel (the radiation power outside the virtual beam is reduced comparing to the case when intensity modulation is applied or light sources with short coherence length is used and amplitude modulation or polarization modulation is applied) and signal strength at the targets under investigation.

Additional Embodiments—Combination with Phased Array

The intensity modulation described in the earlier embodiments may be combine with a phased array technology (either radio frequency or optical). A phased array is formed of multiple signal transmitters arranged in a two-dimensional array, where the phase of the signal transmitted by each individual transmitter is dynamically modulated, so as to form a specific output beam pattern through interference effect. Phased array transmitters can be used to steer the direction of emitted signal beams, and phased array receivers can be used to steer the view direction of the sensor, without any moving parts.

According to embodiments of the present invention, in a modified phased array, the phase of the transmitted signal of each individual transmitter is dynamically modulated according to conventional phased array principles, and at the same time, the intensity of the signal transmitted by each individual transmitter is modulated by a multi-valued signal as described in earlier embodiments of the present invention. Thus, for example, in the embodiment of FIG. 4, each light modulator in the modulator array 44-1 to 44-*n* has two parts. The first part of the two parts is an intensity modulator; the second part of the two parts is a phase modulator or phase tuner. Among the light modulator drivers 43-1 to 43-*n*, each one also has two driver channels corresponding to the two parts of the modulator in the modulator. The signal processing unit supplies two signals to each light modulator driver. One is the multi-valued signal for the intensity modulation of light; the other is a control signal to tune the phase delay of the phase modulator or tuner so that a phase array function can be achieved. The two types of signals generated in the signal processing unit are well synchronized so that the virtual beams generated by the group of delayed multi value signals well overlap with the beams generated by the phased array.

By combining phase modulation in conventional phased array with intensity modulation using the multi-valued signal array according to embodiments of the present invention, the side effects or interferences due to side lobes from the phased array can be significantly reduced. The ability of precisely pointing the beam of radiation can be greatly improved, regardless of whether it is a radio wave or optical wave which are all electromagnetic wave with different frequencies. This can improve the performance of the phased array because of the signal-to-noise ratio improvement and interference reduction from the side lobes.

By combining phase modulation of phased array with intensity modulation, the resulting device can be more power efficient. In addition, the emission of the radiation from the device will no longer be in any direction but only in the direction in which the radiation needs to be directed. This also reduce the interference between different devices.

When combining the phase modulation of a phased array with intensity modulation, it is important to ensure the synchronization between the phase modulation of the phased array and the delay control of the multi-valued signal array. The beam direction of the array should be the same as the beam direction of the multi-valued signal array at any time. Any synchronization error may cause performance degradation of the system.

Other Applications

Embodiments of the present invention can not only be used in laser range finding device and Lidar but also be implemented in radio wave range finding device and radar and range finding device operated on different frequency other than light wave frequency and radio wave frequency, e.g. sonar (which uses sound signal, a mechanical signal). Comparing with existing phased array technology, the phased array device incorporating intensity modulation according to embodiments of the present invention reduces the side effects from the side lobes which are generated during the beam forming process of the phased array. This will give better signal to noise ratio, lower interference, and higher power efficiency. Here, for Lidar, Radar or Sonar, individually using the technology in the embodiments of the present invention can also achieve better results. Combining the intensity modulation method with existing phased array technology can enhance the performance of Lidar, Radar, or Sonar.

Embodiments of the present invention can also be implemented by using the multi-valued signal to directly generate varying electric fields instead of performing radio wave or light wave modulation. This will result in emission of electromagnetic wave with even wider bandwidth. By doing so, the ranging resolution, accuracy, and precision can be further improved (benefits from the wider bandwidth of the signal), and the interference can be further reduced. Human safety can also be further improved due to the further reduced spectral density. The technology can similarly be applied to sound wave.

When the technology is implemented in radar and sonar systems, the various components shown in FIGS. 1-8 may be modified accordingly. For example, the light emitters and light emitter drivers (in FIGS. 1, 3, 5, 7), or the light source, the light modulator drivers and the light modulators (in FIGS. 2, 4, 6, 8), may be replaced with radio signal transmitters or sound transmitters with integrated or associated signal modulators. Such transmitters may include, for example, a local oscillator and appropriate modulators. Modulation may be amplitude modulation, intensity modulation, angle modulation, etc. Such transmitters are encompassed by the emitting devices recited in the appended claims. Likewise, the photo detectors in FIGS. 1-8 may be replaced with radio signal receivers or sound receivers, which are encompassed by the detector recited in the appended claims. The optical transmitting and receiving paths in FIGS. 1-8 may be replaced by antennas or a free space transmitting and receiving path, which are encompassed by the transmitting and receiving path recited in the appended claims.

The various components in the systems in the above described embodiments may be implemented in hardware, including logical circuits. Some of the components, including the signal generators, the signal processing units, the correlators, the signal processing and correlating units, and the timing and digital control units, may alternatively be software based, i.e., implemented by processors with associated non-transitory memory, where the processor executes program code stored in the memory to perform the described functions. Although in the drawing figures the components are schematically represented by different boxes, in actual implementation some of them may be combined in the same chips. Further, when one component is said to be coupled to another component, they are not necessarily directly coupled to each other, and additional components may be present between them.

The optical transmitting path and receiving path in the above embodiments includes lens and optionally other optics used to project light to illuminate the target, and lens and optionally other optics used to collect reflection light signal from the target and project the signal onto the photo detector.

The laser range finding systems using multi-valued signals according to the embodiments of the present invention have the following advantages: They employ low peak and average transmitting light power to illuminate the target. The energy of the emitted signal is spread in both the time domain and frequency domain, which reduces the interferences and improve safety. By performing the time domain correlation of the emitted signals or the signals derived from the emitted signals and received signals, time domain virtual pulse generation and compression are achieved. In this process, signal strength is improved and at the same time the noise level which is resulted from interferences from other device and environment are greatly reduced. They work well even with lower than 0 dB signal to noise ratio in the receiving channels. They can withstand interferences from other optical measurement devices. They reduce the possibility of causing interferences between individual laser ranging systems nearby, and reduce the possibility of causing interferences to other optical measurement devices nearby. The system can achieve much better signal to noise ratio compared to all the methods used in existing laser range finders and lidars.

It will be apparent to those skilled in the art that various modification and variations can be made in the laser range finding systems and related method of the present invention without departing from the spirit or scope of the invention. Thus, it is intended that the present invention cover modifications and variations that come within the scope of the appended claims and their equivalents.

What is claimed is:

1. A time of flight ranging system, comprising:
a plurality of emitting devices forming an array;
a signal generator configured to generate a time varying multi-valued modulation signal;
a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the array and a target direction which is a direction from a reference point of the array to a target point on a target being ranged;
wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal;
a transmitting and receiving path, configured to transmit the plurality of wave signals emitted by the plurality of emitting devices toward the target and to receive a reflected wave signal reflected by the target, the reflected wave signal including the plurality of wave signals having been reflected by the target;
a detector configured to detect the reflected wave signal and generate a detected signal; and
a correlator, coupled to the signal processing unit to receive the time varying multi-valued modulation signal, and coupled to the detector to receive the detected signal, the correlator being configured to correlate the time varying multi-valued modulation signal with the detected signal to generate an output signal which represents a round trip flight time from the ranging system to the target point,
wherein each of the plurality of emitting devices includes a light emitter and a light emitter driver, wherein each light emitter driver is coupled to the signal processing unit to receive the corresponding delayed modulation signal and configured to drive the corresponding light emitter to emit a light signal having modulated intensities that are proportional to the corresponding delayed modulation signal, and wherein the plurality of light emitters of the plurality of emitting devices form an array of light emitters.

2. The time of flight ranging system of claim 1, further comprising:
an analog signal conditioning circuit disposed between the detector and the correlator and configured to process the detected signal generated by the detector; and
a timing and digital control unit, coupled to and configured to provide control signals to the signal generator, the signal processing unit, the emitting devices, the analog signal conditioning circuit, and the correlator.

3. The time of flight ranging system of claim 1, wherein the wave signal is a light signal or a radio signal or a mechanical signal.

4. The time of flight ranging system of claim 1,
wherein the signal generator is configured to sequentially generate multiple time varying multi-valued modulation signals,
wherein the signal processing unit is configured to sequentially generate multiple corresponding sets of delayed modulation signals, each set corresponding to a target point on the target,
wherein each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and
wherein the correlator is configured to sequentially correlate the multiple time varying multi-valued modulation signal with the detected signal to generate multiple output signals each representing a round trip flight time from the ranging system to the corresponding target point.

5. A time of flight ranging system, comprising:
a plurality of emitting devices forming an array;
a signal generator configured to generate a time varying multi-valued modulation signal;
a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the array and a target direction which is a direction from a reference point of the array to a target point on a target being ranged;
wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal;
a transmitting and receiving path, configured to transmit the plurality of wave signals emitted by the plurality of emitting devices toward the target and to receive a reflected wave signal reflected by the target, the reflected wave signal including the plurality of wave signals having been reflected by the target;
a detector configured to detect the reflected wave signal and generate a detected signal; and
a correlator, coupled to the signal processing unit to receive the time varying multi-valued modulation signal, and coupled to the detector to receive the detected signal, the correlator being configured to correlate the time varying multi-valued modulation signal with the detected signal to generate an output signal which represents a round trip flight time from the ranging system to the target point,
wherein each of the plurality of emitting devices includes a light modulator and a light modulator driver, wherein each light modulator driver is coupled to the signal processing unit to receive the corresponding delayed modulation signal and configured to drive the corresponding light modulator to modulate a light signal to generate a modulated light signal having modulated intensities or modulated amplitudes or modulated polarizations that are proportional to the corresponding delayed modulation signal, and wherein the plurality of light modulators of the plurality of emitting devices form an array of light modulators.

6. The time of flight ranging system of claim 5, further comprising:
an analog signal conditioning circuit disposed between the detector and the correlator and configured to process the detected signal generated by the detector; and
a timing and digital control unit, coupled to and configured to provide control signals to the signal generator, the signal processing unit, the emitting devices, the analog signal conditioning circuit, and the correlator.

7. The time of flight ranging system of claim 5, wherein the wave signal is a light signal or a radio signal or a mechanical signal.

8. The time of flight ranging system of claim 5,
wherein the signal generator is configured to sequentially generate multiple time varying multi-valued modulation signals,
wherein the signal processing unit is configured to sequentially generate multiple corresponding sets of delayed modulation signals, each set corresponding to a target point on the target,
wherein each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and
wherein the correlator is configured to sequentially correlate the multiple time varying multi-valued modulation signal with the detected signal to generate multiple output signals each representing a round trip flight time from the ranging system to the corresponding target point.

9. A time of flight ranging system, comprising:
a plurality of emitting devices forming an array;
a signal generator configured to generate a time varying multi-valued modulation signal;
a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the array and a target direction which is a direction from a reference point of the array to a target point on a target being ranged;
wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal;
a transmitting and receiving path, configured to transmit the plurality of wave signals emitted by the plurality of emitting devices toward the target and to receive a reflected wave signal reflected by the target, the reflected wave signal including the plurality of wave signals having been reflected by the target;
a detector configured to detect the reflected wave signal and generate a detected signal; and
a correlator, coupled to the signal processing unit to receive the time varying multi-valued modulation signal, and coupled to the detector to receive the detected signal, the correlator being configured to correlate the time varying multi-valued modulation signal with the detected signal to generate an output signal which represents a round trip flight time from the ranging system to the target point,
wherein the signal generator is configured to simultaneously generate multiple time varying multi-valued modulation signals,
wherein the signal processing unit is configured to simultaneously generate multiple corresponding sets of delayed modulation signals, each set corresponding to a target point on the target, wherein each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and wherein the signal processing unit is further configured to superimpose multiple delayed modulation signals, among the multiple sets of delayed modulation signals, that correspond to the same emitting device;

wherein the correlator is a multi-channel correlator which is configured to receive the multiple modulation signals and to separately and simultaneously correlate the multiple modulation signal with the detected signal to generate multiple output signals each representing a round trip flight time from the ranging system to a corresponding target point.

10. The time of flight ranging system of claim 9, further comprising:
an analog signal conditioning circuit disposed between the detector and the correlator and configured to process the detected signal generated by the detector; and
a timing and digital control unit, coupled to and configured to provide control signals to the signal generator, the signal processing unit, the emitting devices, the analog signal conditioning circuit, and the correlator.

11. The time of flight ranging system of claim 9, wherein the wave signal is a light signal or a radio signal or a mechanical signal.

12. The time of flight ranging system of claim 9,
wherein the signal generator is configured to sequentially generate multiple time varying multi-valued modulation signals,
wherein the signal processing unit is configured to sequentially generate multiple corresponding sets of delayed modulation signals, each set corresponding to a target point on the target,
wherein each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the array and a corresponding target direction which is a direction from the reference point of the array to the corresponding target point, and
wherein the correlator is configured to sequentially correlate the multiple time varying multi-valued modulation signal with the detected signal to generate multiple output signals each representing a round trip flight time from the ranging system to the corresponding target point.

13. A time of flight ranging system comprising:
a signal processing unit configured to generate a time varying multi-valued modulation signal;
an emitting device coupled to the signal processing unit to receive the modulation signal, and configured to emit a wave signal having modulated intensities or modulated amplitudes or modulated polarizations that are proportional to the modulation signal;
a transmitting and receiving path, configured to transmit the wave signal emitted by the emitting device toward the target and to receive a reflected wave signal reflected by the target;
a plurality of detectors forming an array, each detector configured to detect the reflected wave signal and generate a detected signal; and
a signal processing and correlating unit, coupled to the signal processing unit to receive the time varying multi-valued modulation signal, and coupled to the plurality of detectors to receive the corresponding detected signals, the signal processing and correlating unit being configured to delay the detected signal from each of the plurality of detectors by a predetermined time delay to generate a corresponding delayed signal, the predetermined time delay being determined by a spatial position of the corresponding detector in the array and a target direction which is a direction from a reference point of the array to a target point on a target being ranged, the signal processing and correlating unit further being configured to correlate the time varying multi-valued modulation signal with a sum of the plurality of delayed signals to generate an output signal which represents a round trip flight time from the ranging system to the target point.

14. The time of flight ranging system of claim 13, wherein the emitting device includes a light emitter and a light emitter driver, wherein the light emitter driver is coupled to the signal processing unit to receive the modulation signal and configured to drive the light emitter to emit a light signal having modulated intensities that are proportional to the modulation signal.

15. The time of flight ranging system of claim 13, wherein the emitting device includes a light modulator and a light modulator driver, wherein the light modulator driver is coupled to the signal processing unit to receive the modulation signal and configured to drive the light modulator to modulate a light signal to generate a modulated light signal having modulated intensities or modulated amplitudes or modulated polarizations that are proportional to the modulation signal.

16. The time of flight ranging system of claim 13, further comprising:
a plurality of analog signal conditioning circuits each disposed between a corresponding one of the plurality of the detectors and the signal processing and correlating unit and is configured to process the detected signal generated by the corresponding detector; and
a timing and digital control unit, coupled to and configured to provide control signals to the signal processing unit, the emitting device, the analog signal conditioning circuits, and the signal processing and correlating unit.

17. The time of flight ranging system of claim 13, wherein the wave signal is a light signal or a radio frequency signal or a mechanical signal.

18. The time of flight ranging system of claim 13,
wherein the signal processing unit is configured to sequentially generate multiple time varying multi-valued modulation signals,
wherein the signal processing and correlating unit is configured to sequentially generate multiple corresponding sets of delayed signals, each set corresponding to a target point on the target,
wherein each set includes a plurality of delayed signals, each delayed signal being the detected signal from a corresponding one of the plurality of detectors delayed by a predetermined time delay, the predetermined time delay being determined by a spatial position of the corresponding detector in the array and a corresponding target direction which is a direction from the reference point of the array to the corresponding target point, and wherein the signal processing and correlating unit is further configured to sequentially correlate the multiple time varying multi-valued modulation signal with a sum of each set of the plurality of delayed signal to generate multiple output signals each representing a round trip flight time from the ranging system to the corresponding target point.

19. The time of flight ranging system of claim 13, wherein the signal processing unit is configured to generate one time varying multi-valued modulation signal, or to simultaneously generate multiple time varying multi-valued modulation signals and to superimpose the multiple modulation signals;

wherein the signal processing and correlating unit is a multi-channel signal processing and correlating unit and is configured to receive the one modulation signal or the multiple modulation signals, and to separately and simultaneously generate multiple sets of delayed signals, each set corresponding to a target point on the target, wherein each set includes a plurality of delayed signals, each delayed signal being the detected signal from a corresponding one of the plurality of detectors delayed by a predetermined time delay, the predetermined time delay being determined by a spatial position of the corresponding detector in the array and a corresponding target direction which is a direction from the reference point of the array to the corresponding target point, and wherein the signal processing and correlating unit is further configured to separately and simultaneously correlate the one modulation signal or one of the multiple modulation signals with a sum of each set of the plurality of delayed signal to simultaneously generate multiple output signals each representing a round trip flight time from the ranging system to the corresponding target point.

20. A time of flight ranging system comprising:

a plurality of emitting devices forming an emitting device array;

a signal generator configured to generate a time varying multi-valued modulation signal;

a signal processing unit coupled to the signal generator to receive the time varying multi-valued modulation signal and configured to generate a plurality of delayed modulation signals, wherein each delayed modulation signal corresponds to one of the plurality of emitting devices and is the time varying multi-valued modulation signal delayed by a predetermined time delay, the predetermined time delay being determined by a spatial position of the corresponding emitting device in the emitting device array and a target direction which is a direction from a reference point of the emitting device array to a target point on a target being ranged;

wherein each of the plurality of emitting devices is coupled to the signal processing unit to receive the corresponding delayed modulation signal, each emitting device being configured to emit a wave signal having modulated intensities or modulated amplitudes or modulated polarizations that are proportional to the corresponding delayed modulation signal;

a transmitting and receiving path, configured to transmit the plurality of wave signals emitted by the plurality of emitting devices toward the target and to receive a reflected wave signal reflected by the target, the reflected wave signal including the plurality of wave signals having been reflected by the target;

a plurality of detectors forming a detector array, each detector configured to detect the reflected wave signal and generate a detected signal; and a signal processing and correlating unit, coupled to the signal processing unit to receive the time varying multi-valued modulation signal, and coupled to the plurality of detectors to receive the corresponding detected signals, the signal processing and correlating unit being configured to delay the detected signal from each of the plurality of detectors by a predetermined time delay to generate a corresponding delayed signal, the predetermined time delay being determined by a spatial position of the corresponding detector in the detector array and a target direction which is a direction from a reference point of the detector array to a target point on a target being ranged, the signal processing and correlating unit further being configured to correlate the time varying multi-valued modulation signal with a sum of the plurality of delayed signals to generate an output signal which represents a round trip flight time from the ranging system to the target point.

21. The time of flight ranging system of claim 20, wherein each of the plurality of emitting devices includes a light emitter and a light emitter driver, wherein each light emitter driver is coupled to the signal processing unit to receive the corresponding delayed modulation signal and configured to drive the corresponding light emitter to emit a light signal having modulated intensities that are proportional to the corresponding delayed modulation signal, and wherein the plurality of light emitters of the plurality of emitting devices form an array of light emitters.

22. The time of flight ranging system of claim 20, wherein each of the plurality of emitting devices includes a light modulator and a light modulator driver, wherein each light modulator driver is coupled to the signal processing unit to receive the corresponding delayed modulation signal and configured to drive the corresponding light modulator to modulate a light signal to generate a modulated light signal having modulated intensities or modulated amplitudes or modulated polarizations that are proportional to the corresponding delayed modulation signal, and wherein the plurality of light modulators of the plurality of emitting devices form an array of light modulators.

23. The time of flight ranging system of claim 20, further comprising:

a plurality of analog signal conditioning circuits each disposed between a corresponding one of the plurality of the detectors and the signal processing and correlating unit and is configured to process the detected signal generated by the corresponding detector; and a timing and digital control unit, coupled to and configured to provide control signals to the signal processing unit, the emitting device, the analog signal conditioning circuits, and the signal processing and correlating unit.

24. The time of flight ranging system of claim 20, wherein the wave signal is a light signal or a radio signal or a mechanical signal.

25. The time of flight ranging system of claim 20, wherein the signal generator is configured to sequentially generate multiple time varying multi-valued modulation signals, wherein the signal processing unit is configured to sequentially generate multiple corresponding sets of delayed modulation signals, each set corresponding to a target point on the target, wherein each set includes a plurality of delayed modulation signals, each delayed modulation signal corresponds to one of the plurality of emitting devices and is the corresponding time varying multi-valued modulation signal delayed by a predetermined time delay, the predetermined time delay being determined by a spatial position of the corresponding emitting device in the emitting device array and a corresponding target direction which is a direction from the reference point of the emitting device array to the corresponding target point, and wherein the signal processing and correlating unit is further configured to sequentially correlate the multiple time varying multi-valued modulation signal with a sum of each set of the plurality of delayed signal to generate multiple output signals each representing a round trip flight time from the ranging system to the corresponding target point.

26. The time of flight ranging system of claim 20, wherein the signal generator is configured to simultaneously generate multiple time varying multi-valued modulation signals, wherein the signal processing unit is configured to simultaneously generate multiple corresponding sets of delayed modulation signals, each set corresponding to a target point on the target, wherein each set includes a plurality of delayed modulation signals, each delayed modulation signal corresponds to one of the plurality of emitting devices and is the corresponding time varying multi-valued modulation signal delayed by a predetermined emitting time delay, the predetermined emitting time delay being determined by a spatial position of the corresponding emitting device in the emitting device array and a corresponding target direction which is a direction from the reference point of the emitting device array to the corresponding target point, and wherein the signal processing unit is further configured to superimpose multiple delayed modulation signals, among the multiple sets of delayed modulation signals, that correspond to the same emitting device;

wherein the signal processing and correlating unit is a multi-channel signal processing and correlating unit and is configured to receive the multiple modulation signals, and to separately and simultaneously generate multiple sets of delayed signals, each set corresponding to a target point on the target, wherein each set includes a plurality of delayed signals, each delayed signal being the detected signal from a corresponding one of the plurality of detectors delayed by a predetermined receiving time delay, the predetermined receiving time delay being determined by a spatial position of the corresponding detector in the detector array and a corresponding target direction which is a direction from the reference point of the detector array to the corresponding target point, and wherein the signal processing and correlating unit is further configured to separately and simultaneously correlate the one modulation signal or one of the multiple modulation signals with a sum of each set of the plurality of delayed signal to simultaneously generate multiple output signals each representing a round trip flight time from the ranging system to the corresponding target point.

* * * * *